United States Patent [19]

Sato et al.

[11] Patent Number: 5,179,717
[45] Date of Patent: Jan. 12, 1993

[54] SORTING CIRCUIT USING FIRST AND LAST BUFFER MEMORIES ADDRESSED BY REFERENCE AXIS DATA AND CHAIN BUFFER MEMORY ADDRESSED BY DATUM NUMBER OF THE FIRST AND LAST BUFFER MEMORIES

[75] Inventors: Seiichi Sato; Shigeichi Nakamura, both of Tokyo, Japan

[73] Assignee: Manco, Ltd., Tokyo, Japan

[21] Appl. No.: 435,277

[22] Filed: Nov. 13, 1989

[30] Foreign Application Priority Data

Nov. 16, 1988 [JP] Japan .................. 63-289672

[51] Int. Cl.⁵ .................... G06F 7/34; G06F 15/62
[52] U.S. Cl. .................... 395/800; 364/251.5; 364/259.4; 364/920.8; 364/942.6; 364/960.1; 364/962.3; 364/222.9; 364/DIG. 1; 40/146.2; 395/425
[58] Field of Search ... 364/200 MS File, 900 MS File; 340/146.2; 395/800, 400, 425

[56] References Cited

U.S. PATENT DOCUMENTS

| | | | |
|---|---|---|---|
| 4,443,860 | 4/1984 | Vidalin | 364/900 |
| 4,570,221 | 2/1986 | Martens | 364/200 |
| 4,679,139 | 7/1987 | Durbin | 364/200 |
| 4,991,134 | 2/1991 | Ivsin | 364/900 |

*Primary Examiner*—Thomas C. Lee
*Assistant Examiner*—Ken S. Kim
*Attorney, Agent, or Firm*—Oliff & Berridge

[57] ABSTRACT

A circuit for sorting a plurality of inputted (reference-axis) data includes an index generator for generating an index (datum number) for each of the inputted data; a first buffer memory having storage areas each of which can be addressed by the data, the first buffer memory for storing an index generated by the index generator when the corresponding data is initially inputted into the index generator; a last buffer memory having storage areas each of which can be addressed by the data, the last buffer memory for updating and storing an index generated by the index generator at each time when the corresponding data is inputted thereinto; a chain buffer memory having chain index storage areas each of which can be addressed by the previous index in the chain; a first control for writing a new updated index into a chain index storage area addressed by a before-updated index at each time when the index of the last buffer memory is updated; a second control for writing the index of the data into the chain datum number storage areas so that they will be chained with each other in the ascending or descending order of the sorted data; and a third control for reading the index in the chain index storage areas in accordance with a predetermined read-out rule index. Such an arrangement of the sorting circuit can sort and output a plurality of data in a simple and high-speed manner.

21 Claims, 23 Drawing Sheets

SORTING CIRCUIT USING FIRST AND LAST BUFFER MEMORIES ADDRESSED BY REFERENCE AXIS DATA AND CHAIN BUFFER MEMORY ADDRESSED BY DATUM NUMBER OF THE FIRST AND LAST BUFFER MEMORIES

BACKGROUND OF THE INVENTION

1. Field of the Invention:

The present invention relates to a circuit for sorting data relating to a plurality of reference axes.

2. Description of Related Art:

There is known an image synthesizer for synthesizing image signals of an image to be displayed on CRT, based on the external information of that image. Such an image synthesizer is capable of not only synthesizing two-dimensional images but also three-dimensional images and currently used over a broad range of application, for example, in three-dimensional video games, simulators for various vehicles such as airplane and the like, computer graphics or CAD display.

In order to synthesize a three-dimensional image having a depth in real-time, the image synthesizer is required to high-speed sort image data of a three-dimensional object for each frame, based on the coordinates in the depth direction, that is, Z-axis data of the image.

It has been desired to develop a circuit for high-speed sorting three-dimensional data based on a predetermined reference-axis data, that is, Z-axis data.

In the past, the sorting was performed such that all the data were processed by sequentially comparing a Z-axis datum with the adjacent Z-axis datum within the data and re-arranging the Z-axis data on the result of each comparison.

Thus, many transfers of all the Z-axis data between memories must be repetitively. This raises a problem when the sorting should be performed at high speed.

As the number of Z-axis data to be processed increases, the sorting is correspondingly degraded in time and labor. If such a problem is to be overcome by the present technique, a computer having a relatively large capacity must be used. This leads to more complexity and increased cost in the entire sorting system.

SUMMARY OF THE INVENTION

It is therefore an object of the present invention to a sorting circuit having a simplified construction which can sort a plurality of data at high speed and particularly which can sort an increased number of reference-axis data to be processed in the system.

To this end, the present invention provides a circuit for sorting a plurality of inputted reference-axis data, comprising means for generating a datum number corresponding to each of the inputted reference-axis data; a first buffer memory having first datum number storage areas which are addressed by said reference-axis data, each of the first datum number storage areas being adapted to store a datum number generated by said datum number generating means when a reference-axis datum corresponding to each of the first datum number storage areas is first inputted into said buffer memory; at last buffer memory having last datum number storage areas which are addressed by said reference-axis data, each of the last datum number storage areas being adapted to update and store a datum number generated by said datum number generating means at each time when a reference-axis datum corresponding to each of said last datum number storage areas is inputted into said last buffer memory; a chain buffer memory having a chain datum number storage areas each of which is addressed by the corresponding datum number; a first control means for writing a new updated datum number into a chain datum number storage area addressed by a before-updated datum number in said last buffer memory at each time when the before-updated datum number is updated; a second control means for writing a datum number stored in one of said first datum number storage areas corresponding to a last datum number storage area in a predetermined relation therebetween into a chain datum number storage area addressed by a datum number stores in the last-mentioned last datum number storage area after the writing of said datum numbers into said first and last buffer memories has been completed, thereby causing the reference-axis data to chain in said chain datum number storage areas in ascending or descending order; and a third control means for reading the datum numbers out of said chain datum number storage areas in accordance with a predetermined read-out rule and then sorting and outputting the inputted reference-axis data in the sequence of the read-out datum numbers.

The present invention also provides a sorting circuit for sorting a plurality of inputted data based on given reference-axis data, comprising an information memory for storing the necessary portion of each of said plurality of inputted data in the sequence of the datum numbers and sorting means for receiving the reference-axis data in said data, said sorting means comprising means for generating a datum number corresponding to each of the inputted reference-axis data; a first buffer memory having first datum number storage areas which are addressed by said reference-axis data, each of the first datum number storage areas being adapted to store a datum number generated by said datum number generating means when a reference-axis datum corresponding to each of the first datum number storage areas is first inputted into said first buffer memory; a last buffer memory having last datum number storage areas which are addressed by said reference-axis data, each of the last datum number storage areas being adapted to update and store a datum number generated by said datum number generating means at each time when a reference-axis datum corresponding to each of said last datum number storage areas is inputted into said last buffer memory; a chain buffer memory having chain datum number storage areas each of which is addressed by the corresponding datum number; first control means for writing a new updated datum number into a chain datum number storage area addressed by a before-updated datum number in said last buffer memory at each time when the before-updated datum number is updated; a second control means for writing a datum number stored in one of said first datum number storage areas corresponding to a last datum number storage area in a predetermined relation therebetween into a chain datum number storage area addressed by the number of a datum stored in the last-mentioned last datum number storage area after the writing of said datum numbers into said first and last buffer memories has been completed, thereby causing the reference-axis data to chain in said chain datum number storage areas in ascending or descending order; and a third control means for reading the numbers of the data out of said chain datum number storage areas in accordance with a predetermined read-out rule and reading the data from said information memory in the sequence of the read-out datum numbers.

In such an arrangement, the reference-axis data to be processed are inputted into the first and last buffer memories in the order following their datum numbers.

The first buffer memory then stores the datum number of a reference-axis datum when it is first inputted thereinto into the corresponding first datum number storage area of the first buffer memory.

Similarly, the last buffer memory sequentially updates and stores the datum number of a reference-axis datum into the corresponding last datum number storage area of the last buffer memory at each time when the reference-axis datum is read out. Therefore, each of the last datum number storage areas will store a datum number when the corresponding reference-axis datum is last read out.

When a datum number stored in the last datum number storage area is updated and stored, the datum number stored in that storage area and the new stored datum number are supplied to the chain buffer memory. At each time when a datum is updated in each of last datum number storage areas, the chain buffer memory will write the new updated datum number into a chain datum number storage area specified by the before-updated datum number. If reference-axis data having the same value but being only different from each other in the datum number are repetitively inputted into the chain buffer memory, therefore, the history of these reference-axis data, that is, how sequence of the datum number the reference-axis data are inputted into the chain buffer memory will be written therein at the chain datum number storage areas.

After completion of these writing operations into the first, last and chain buffer memories, each of the datum numbers stored in the first datum number storage areas corresponding to the last datum number storage areas in a predetermined relationship therewith will be sequentially written into the corresponding chain datum number storage area specified by the datum number stored in said last datum number storage area. Thus, the respective numbers of the data relating to the reference-axis data will be written into the chain buffer memory at its respective chain datum number storage areas to chain them in the ascending or descending order.

The sorting circuit of the present invention also reads the datum numbers out of the chain datum number storage areas in accordance with a predetermined read-out rule. The reading operation is controlled so that the inputted reference-axis data are outputted in the sequence of the read datum numbers. Thus, the inputted reference-axis data will be sorted and outputted in the ascending or descending order.

In another preferred embodiment, the sorting circuit of the present invention is adapted to control the reading operation so that the data are outputted from the information memory in the order following the read datum numbers. Thus, a plurality of data will be sorted and outputted from the information memory in the ascending or descending order, based on the reference-axis data.

As will be apparent from the foregoing, the present invention can sort the reference-axis data generally simply by making two data transferring operations, that is, one transfer of the inputtted reference-axis data to the first, last and chain buffer memories and another transfer of the data from the first and last buffer memories to the chain buffer memory. In comparison with the conventional sorting technique in which reference-axis data adjacent to each other are compared and sequentially re-arranged based on the result of each comparison, the sorting circuit of the present invention can greatly reduce the number of the data transfers and perform the sorting operation at higher speed.

The sorting circuit of the present invention can more simply and rapidly perform the sorting operation even if the number of reference axes and data is increased, since the sorting operation on the reference-axis data can be made indirectly by utilizing the numbers of the data with respect to the reference-axis data rather than the use of the reference-axis data themselves.

DETAILED DESCRIPTION OF THE PREFERRED EMBOIDMENTS

First Embodiment

Figure 1:
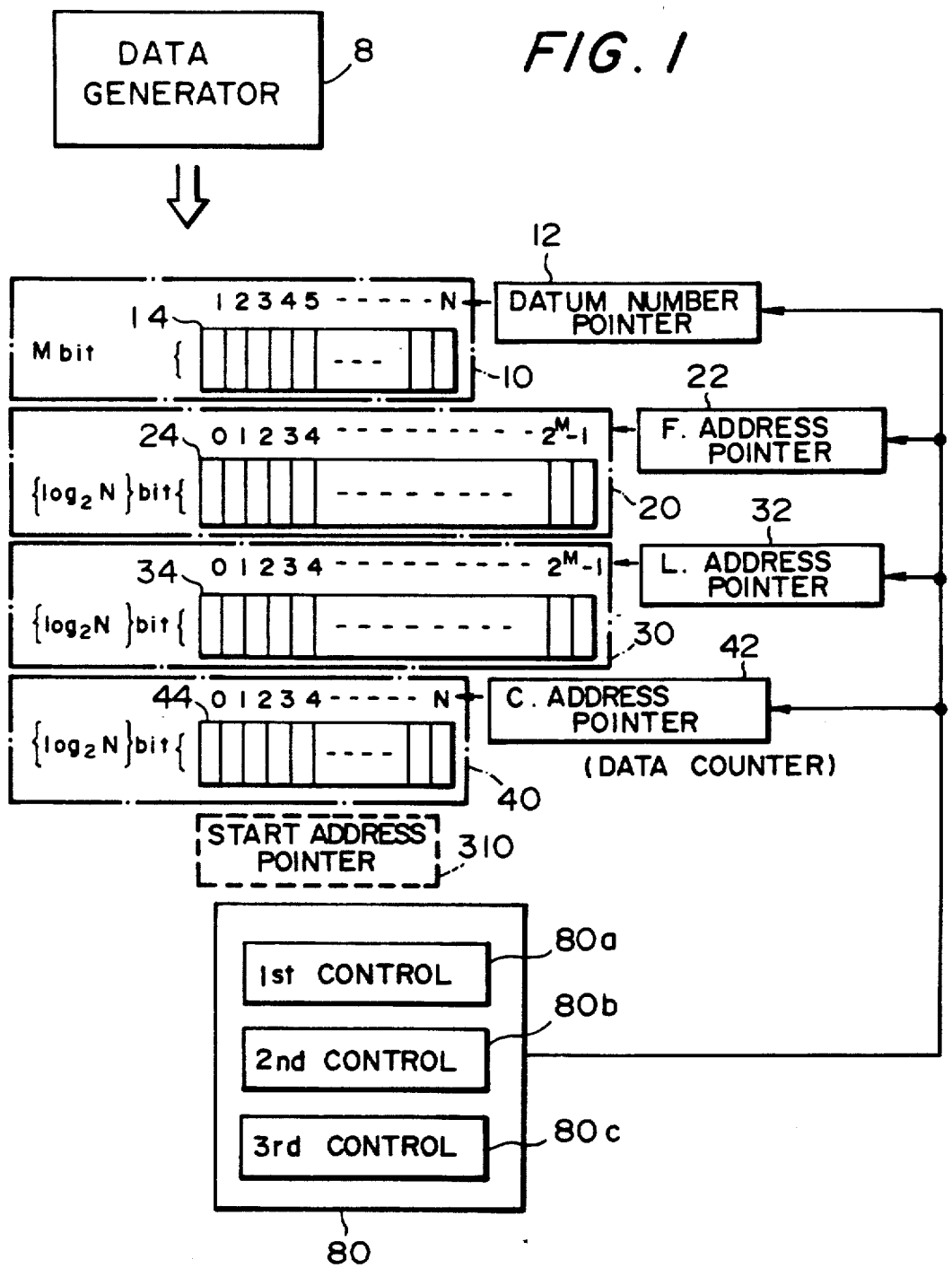
FIG. 1 illustrates the basic construction of a sorting circuit according to the present invention.

Referring now to FIG. 1, there is shown a sorting circuit for sorting and outputting reference-axis data from a data generating circuit 8, which is a first preferred embodiment of the present invention. The sorting circuit comprises a reference-axis data memory 10; a datum number pointer 12; a first buffer memory 20; a last buffer memory 30; a chain buffer memory 40 and a sorting control circuit 80 for controlling the write/read operation relating to the respective memories.

(a) Write/Read to Reference-Axis Data Memory 10

The reference-axis data memory 10 has reference-axis data storage areas 14 equal in number to N which can be specified by the datum number pointer 12. If a reference-axis datum consists of bits equal in number to M, each of the reference-axis data storage areas 14 may be designed to have a capacity capable of storing M bits.

When a plurality of reference-axis data to be processed are externally inputted into the sorting circuit, they are assigned for each of the datum numbers 1 through N in the sequence in which that reference-axis datum is inputted into the sorting circuit and sequentially written into the corresponding one of the reference-axis data storage areas 14 which is addressed by the datum number pointer 12.

On completion of the writing of the reference-axis data to be processed into the reference-axis data memory 10, a reference-axis datum is then read sequentially out of the reference-axis data memory 10 in the order following their datum numbers 1 through N and then supplied to the first and last buffer memories 20 and 30.

In the first embodiment, the reading-out of the reference-axis data can be performed in the sequence wherein the datum numbers are sequentially outputted from the datum number pointer 12 in the sequence from 1 to N as read addresses. If a datum number is addressed, the corresponding reference-axis datum is read out of the specified reference-axis data storage area 14 and send to the first and last buffer memories 20 and 30.

(b) Write to Buffer Memories 20 and 30

The first and last buffer memories 20 and 30 include first and last datum number storage areas 24 and 34, respectively. The number of the datum number storage areas 24 and 34 correspond to all values which can be taken by the reference-axis data.

If a reference-axis datum consists of bits equal in number to M as in the first embodiment, the reference-axis data may take values equal in number to $2^M$; 0, 1, 2 ... ($2^M-1$).

Therefore, the first buffer memory 20 may include first datum number storage areas 24 which are equal in number to at least $2^M$ and can be addressed by addresses 0, 1, 2 ... ($2^M$). Similarly, the last buffer memory 30 may include last datum number storage areas 34 which are equal in number to at least $2^M$ and can be addressed by addresses 0, 1, 2 ... ($2^M$).

Datum numbers representative of reference-axis data from the reference-axis data memory 10 are written into the first and last datum number storage areas 24 and 34. In the first embodiment, each of the first and last datum number storage areas 24 and 34 may be designed to have a capacity represented by $\{\log_2 N\}$ bits where the brace represents an integer.

When a reference-axis datum is inputted into the first or last buffer memory 20 or 30, it writes the datum number of the reference-axis datum into the corresponding datum number storage area 24 or 34 which is addressed by the corresponding address pointer 22 or 23.

In the first embodiment, such a writing will be performed by the first control 80a of the sorting control circuit 80 in the following manner:

As the reference-axis data memory 10 generates at its output a reference-axis datum having its datum number which is addressed by the datum number pointer 12, the reference-axis datum is set in the address pointers 22 and 23 each of which in turn outputs the set reference-axis datum as a write address. The write address then addresses any one of the datum number storage areas 24 and 34 onto which the datum number specified by the datum number pointer 12 (datum number corresponding to that reference-axis datum) will be written.

Each of the first datum number storage areas 24 is designed such that once a datum number is stored therein, any new datum number will not be repeatedly written on that storage area even if a new reference-axis datum having the same value is subsequently outputted from the reference-axis data memory 10. On the contrary, each of the last datum number storage area 34 is designed such that even if the datum number of a reference-axis datum is once stored therein, the datum number of another reference-axis datum outputted from the reference-axis data memory 10 and having the same value as that of the previously stored reference-axis datum can be stored thereover after updated.

In such a manner, each of the first datum number storage areas 24 will store the datum number of the reference-axis datum which initially appears therein. Differently, each of the last datum number storage areas 34 will store the datum number of the reference-axis datum which lastly appears therein.

If only one reference-axis datum is outputted from the reference-axis data memory 10, the same datum number would be written in both the first and last buffer memories 20 and 30 at the same address. If a plurality of reference-axis data having the same value are outputted from the reference-axis data memory 10, the first and last buffer memories 20 and 30 would have datum numbers different from each other at the same address.

Accordingly, where the value in a last datum number storage area 34 of the last buffer memory 30 is updated and stored over plural times and if it can be known how such a updating is performed, a row of datum numbers on reference-axis data when they are sorted in the ascending or descending order can be recognized.

For such a purpose, the sorting circuit of the present invention comprises the chain buffer memory 40 including chain datum number storage areas 44 which can be addressed in the order from 0 to N based on datum numbers from the address pointer 42. It is preferred that each of the chain datum number storage areas also is designed to have a capacity equal to at least $\{\log_2 N\}$ bits, as in the first and last datum number storage areas 24 and 34.

If the content of a last datum number storage areas 34 is updated and stored, the before-updated datum number is set in the address pointer 42 and used to address the corresponding chain datum number storage area 44. Then, new datum number after updated is written into the addressed chain datum number storage area 44. After the updating and storing of the last datum number storage areas 34, thus, the history of updating will be sequentially written in the chain buffer memory 40.

In the first embodiment, it will be apparent from the foregoing that as a reference-axis datum is outputted from the reference-axis data memory 10 in the order determined by its datum number, the outputted reference-axis datum is used as a write address to write its datum number into the first and last buffer memories 20 and 30. Attendantly, there is made a transferring and writing of data from the last buffer memory 30 to the chain buffer memory 40.

On completion of such a transferring and writing of data, another transferring and writing of data from the first and last buffer memories 20 and 30 to the chain buffer memory 40 is initiated.

(c) Transfer and Writing of Data to Buffer Memory 40

On initiation of such a transfer of data, the second control 80b of the sorting control circuit 80 will perform the following control of transfer.

First of all, the number of a datum stored in a last datum number storage area 34 is set in the address pointer 42. In a chain datum number storage area 44 addressed by this address pointer 42 is then written the datum number of a first datum number storage area 24 placed in a predetermined relationship with that address used.

Such a writing operation of the datum number is different between the sortings of data in the ascending and descending orders. However, it will be explained herein to sort data in the ascending order.

For example, if the number of a datum is stored in a last datum number storage area 34 addressed by an address 0, the datum number stored in the zero address is first set at the address pointer 42. Subsequently, the number of a datum is read out of a first datum number storage area 24 addressed by an address 1 and then written into a chain datum number storage area 44 addressed by the address pointer 42.

If no datum number has been stored in the first datum number storage area 24 addressed by the address 1, the number of another datum is read out of a storage area 24 addressed by an address 2 and then written into the chain datum number storage area 44. If no datum number has been stored also in the first datum number storage area 24 addressed by the address 2, addresses k are incremented sequentially in the order of address 3, address 4.

If the desired datum number is read out of a storage area 24 addressed by the address k, that datum number is written into a chain datum number storage area 44 addressed by the address pointer 42.

On completion of such a read/write operation, a datum number is read out of the last datum number storage area 34 addressed by the address k and then used as a write address to write the datum into the corresponding chain datum number storage area 44 as in the previous operations.

The system of the first embodiment will repeat such a write operation into the chain datum number storage areas 44.

When a series of such writing operations are finihsed, the chain datum number storage areas 44 in the chain buffer memory 40 will store the datum numbers to chain the reference-axis data in the ascending order.

The third control 80c of the sorting control circuit 80 then reads the datum numbers written in the chain datum number storage areas 44 in accordance with a predetermined read rule. The reading operation is controlled to cause the reference-axis data memory 10 to output the reference-axis data in the order of the datum numbers thus read out.

In such a manner, the reference-axis data can be sorted in and outputted from the reference-axis data memory 10 in the ascending order.

Concrete Sorting Operation

The sorting circuit will now be described in connection with a case when seven reference-axis data from the data generator 8 are sorted in both the ascending and descending orders.

(I) Sorting in the Ascending Order

Figure 2:
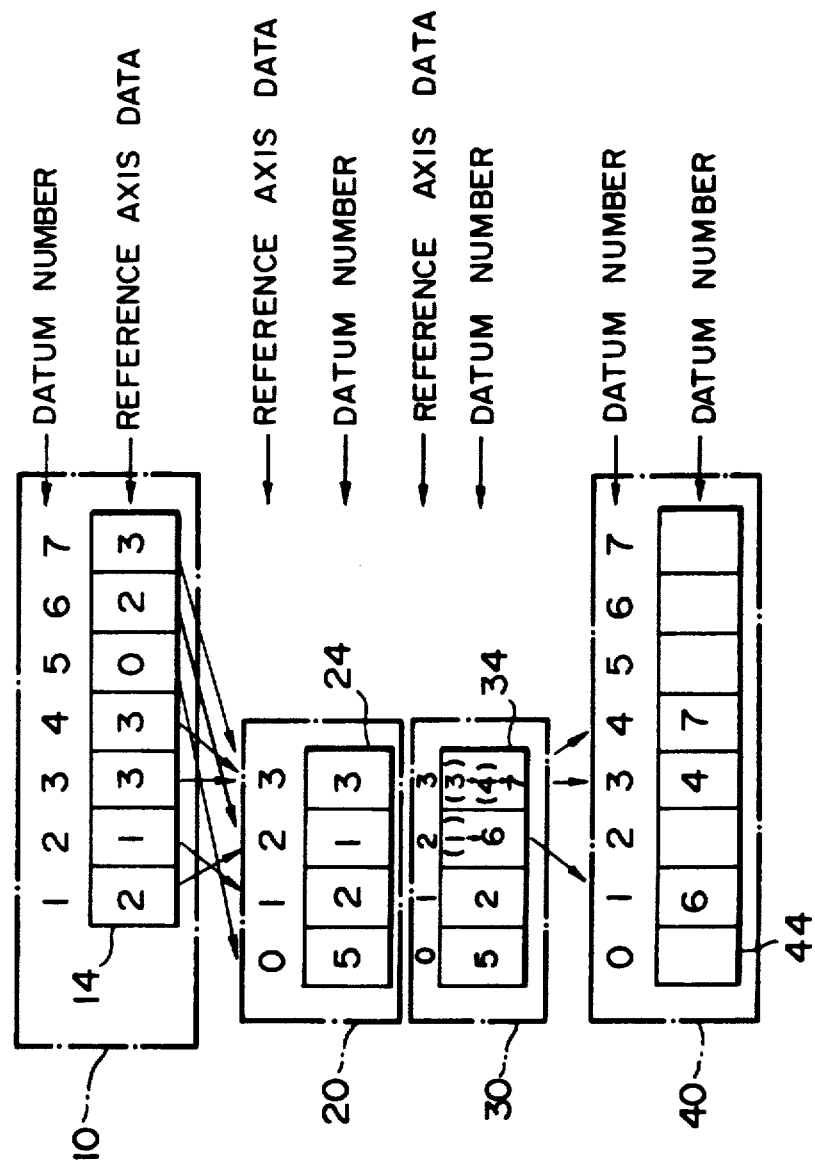
FIG. 2 illustrates the transfer of data from a reference-axis data memory to each of buffer memories.

FIG. 2 shows an example of such sorting circuits.

In order to process seven reference-axis data, the reference-axis data memory 10 is designed to have a total of seven reference-axis data storage areas 14 which can be addressed by the numbers of data one to seven.

It is assumed herein that each of the reference-axis data comprises two-bit data such that any one of 0–3 can be taken. Thus, each of the first and last buffer memories 20 and 30 may have four datum number storage areas 24 or 34 each of which can address four reference-axis data 0–3.

(a) Write/Read to the Reference-axis Data Memory 10

As the reference-axis data are inputted to the reference-axis data memory 10 from the data generator 8 in the following order:

$$2 \rightarrow 1 \rightarrow 3 \rightarrow 3 \rightarrow 0 \rightarrow 2 \rightarrow 3,$$

the inputted reference-axis data will be written into storage areas 14 addressed by datum numbers 1, 2, 3 . . .

One feature of the present invention is that when the reference-axis data are thus written into the data memory 10, they are sorted by using their datum numbers rather than the reference-axis data themselves.

In such a manner, the sorting of the reference-axis data can be performed at high speed by a simplified circuit even if the number of digits in the reference-axis data to be processed increases.

After the reference-axis data are written into the reference-axis data memory 10, they can be read out of the reference-axis data memory 10 sequentially in the order of their datum numbers.

(b) Write into the Buffer Memories 20 and 30

If a reference-axis datum is read out in such a manner, the read reference-axis datum is used as an address corresponding to a datum number which is to be written into first and last datum number storage areas 24 and 34 sequentially.

If a reference-axis datum "2" specified by a datum number "1" is outputted from the data memory 10, therefore, the reference-axis datum "2" is used as an address which is utilized to write the datum number "1" into each of the corresponding datum number storage areas 24 and 34.

Similarly, if a reference-axis datum "1" specified by a datum number "2" is outputted from the reference-axis data memory 10, this reference-axis datum "1" is used as an address for writing its datum number "2" into each of the corresponding datum number storage areas 24 and 34.

If a reference-axis datum "3" specified by a datum number "3" is similarly outputted from the reference-axis data memory 10, the reference-axis datum "3" is used as an address which is used to write its datum number "3" into each of the corresponding datum number storage areas 24 and 34.

If a reference-axis datum "3" specified by a datum number "4" is outputted from the data memory 10, the reference-axis datum "3" is used as an address for inputting the datum number "4" into each of the corresponding datum number storage areas 24 and 34. At this time, the other datum number has been already written into the corresponding datum number storage area 24. Therfore, no new datum number will be written thereinto. On the contrary, the last datum number storage area 34 updates and stores the previous datum number "3" into the new datum number "4". Thus, the after-updated datum number "4" will be written into the corresponding chain datum number storage area 44 by using the before-updated datum number "3" as an address.

If a reference-axis datum "0" specified by a datum number "5" is subsequently read out from the reference-axis data memory 10, this reference-axis datum "0" is utilized as an address for writing the datum number "5" into each of the corresponding datum number storage areas 24 and 34.

If a reference-axis datum "2" specified by a datum number "6" is outputted from the reference-axis data memory 10, the reference-axis datum "2" is used as an address for writing the datum number "6" into each of the corresponding datum number storage areas 24 and 34. At this time, the datum number "1" has been already written into the first datum number storage area 24 addressed by the address "2". Accordingly, the newly inputted datum number "6" will be not written thereinto. On the contrary, the content of the last datum number storage area 34 specified by the address "2" is updated and stored into a newly inputted datum number "6".

When the content of that last datum number storage area 34 is updated from "1" to "6" in such a manner, the before-updated datum number "1" is used as an address for the after-updated datum number "6" into the corresponding chain datum number storage area 44.

If a reference-axis datum "3" specified by a datum number "7" is lastly read out from the reference-axis data memory 10, the reference-axis datum "3" is used as an address which is utilized to write the datum number "7" into each of the corresponding datum number storage areas 24 and 34. At this time, the datum number "3" has been already written into the first datum number storage area 24. Thus, the newly inputted datum number will not be written thereinto. On the contrary, the content of the last datum number storage area 34 is updated and stored into the newly inputted datum number "7".

When the content of the last datum number storage area 34 is updated from "4" to "7", the before-updated datum number "4" is used as an address for storing the after-updated datum number "7" in the corresponding chain datum number storage area 44.

Through such a series of writing operations, the datum number possessed by each of the reference-axis data when it first appears will be written into the corresponding one of the first datum number storage areas 24 which addresses that reference-axis datum.

At each time when a last datum number storage area 34 is updated and stored, the before-updated datum number will be used as an address for writing the after-updated datum number into the corresponding chain datum number storage area 44 which utilizes its datum number as an address. If the same reference-axis datum is outputted from the reference-axis data memory 10 through a plurality of times, this storage area 44 will store the history indicative of how datum number order that reference-axis datum has been outputted from the data memory 10 in.

(c) Transfer and Write of Data into the Buffer memory 40

Figure 3:
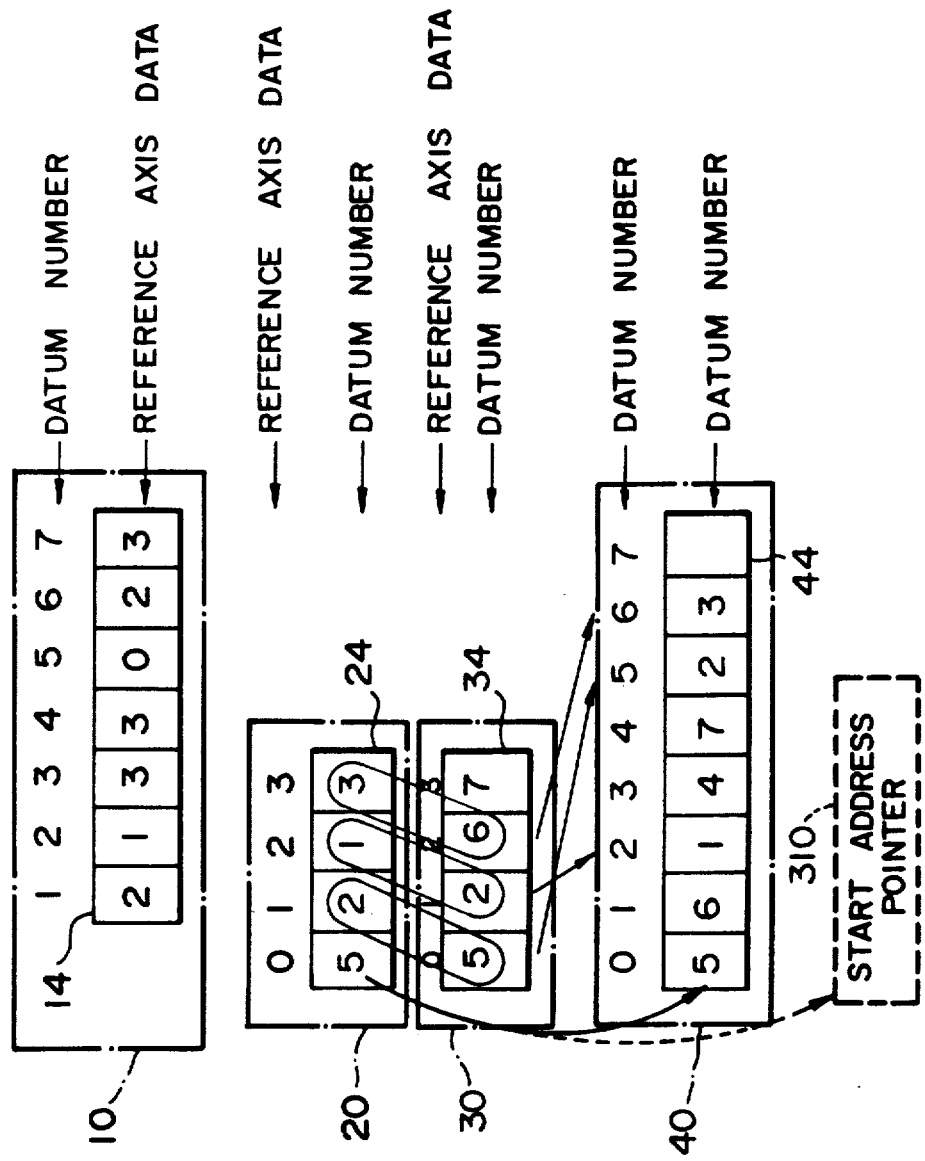
FIGS. 3 and 4 together illustrates the transfers of data from the first and last buffer memories to the chain buffer memory.
Figure 4:
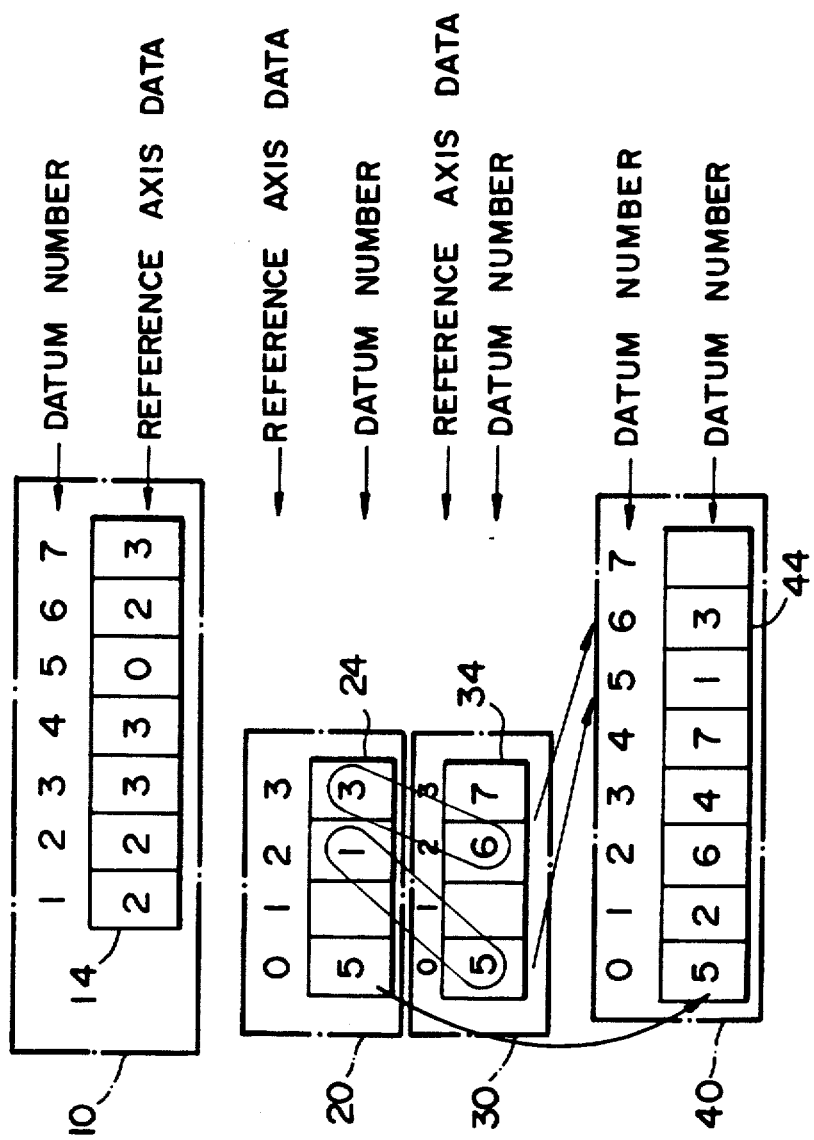

On completion of such a series of writing operations, data initiates to be transferred from the first and last buffer memories 20 and 30 to the chain buffer memory 40, as shown in FIG. 3.

The datum number storage areas 24 in which the data are stored are searched in the order starting from the smallest address. If the desired datum number is found, it is then utilized as a start address and written into the address zero in the chain datum number storage area 44.

If the address zero of the storage area 44 is to be used in the other application, the start address may be set, for example, in a start address pointer 310, as shown by dotted-line in FIG. 3.

As the datum number storage areas 24 are searched in the order starting from the smallest address, it is detected that the desired datum number "5" has been written in the storage area 24 at the address zero. The datum number "5" is then written into the chain datum number storage area 44 specified by the address zero, as shown in FIG. 3.

In the other application, the storage area 44 indicated by the address "0" will be set in the start address pointer 310.

If the reference-axis datum "1" larger than the reference-axis datum "0" initially appears, its datum number is written into the corresponding chain datum number storage area 44 by the use of the datum number of the reference-axis datum "0" which appears lastly as an address.

For such a purpose, the datum number "5" is read out from the last datum number storage area 34 specified by the address "0" as a write address. Datum in the first datum number storage area 24 specified by the address "1" may be written into the chain datum number storage area 44 specified by the address "5".

Datum number of the reference-axis datum "2" which initially appears is written into the corresponding datum number storage area 44 by the use of the datum number of the reference-axis datum "1" which appears lastly as an address.

In order to perform such a writing operation, the datum number "2" is read out from the last datum number storage area 34 specified by the address "1" as a write address. The datum "1" in the first datum number storage area 24 specified by the address "2" may be written into the chain datum number storage area 44 specified by the address "2".

Similarly, the datum number "3" of the reference-axis datum "3" which appears initiately is written into the chain datum number storage area 44 by using the datum number "6" of the reference-axis datum "2" which appears lastly as a write address.

On completion of such a series of data transferring operations, the datum numbers will be written into the chain datum number storage area 44 to chain the reference-axis data in the ascending order.

(d) Sorting and Outputting of Reference-Axis Data

Next, the datum numbers are outputted from the chain buffer memory 40 as read addresses for the reference-axis data memory 10 in accordance with a predetermined read-out rule.

In the present embodiment, a read-out start address has been stored in the chain datum number storage area 44 specified by the address zero. Therefore, the address "0" is first set in the address pointer 42. Thus, the datum number "5" stored in the address "0" of the datum number storage area 44 will be read out as a read-out start address.

In such a manner, a datum number read out from the datum number storage area 44 will be set subsequently in the address pointer 42.

Therefore, the next datum number "2" is read out from the datum number storage area 44 specified by the address "5" with the read datum number being then set in the address pointer 42.

As the datum numbers are subsequently read out in accordance with such a read-out rule, the chain datum number storage areas 44 will output the datum numbers sequentially in the following order:

5→2→1→6→3→4→7.

When the datum numbers thus read out are utilized as data read-out addresses for the reference-axis data memory 10, the latter will sort and output the reference-axis data in the following ascending order:

0→1→2→2→3→3→3.

(II) Sorting in the Descending Order

The sorting circuit of the present invention will now be described in connection with a case where the sorting circuit sorts seven reference-axis data in the descending order as shown in FIG. 2.

(a) Write/Read into the Reference-Axis Data Memory 10

This write/read operation is the same as in the aforementioned operation in which the data are sorted in the ascending order and will not further be described.

(b) Write into the Buffer Memories 20 and 30

This write operation also is the same as in the aforementioned operation with respect to the ascending order and will not further be described.

(c) Transfer and Write of Data to the Buffer Memory 40

The sorting operation in the descending order is slightly different from that in the ascending order with respect to the transfer and write operation of data to the buffer memory 40.

Figure 20:
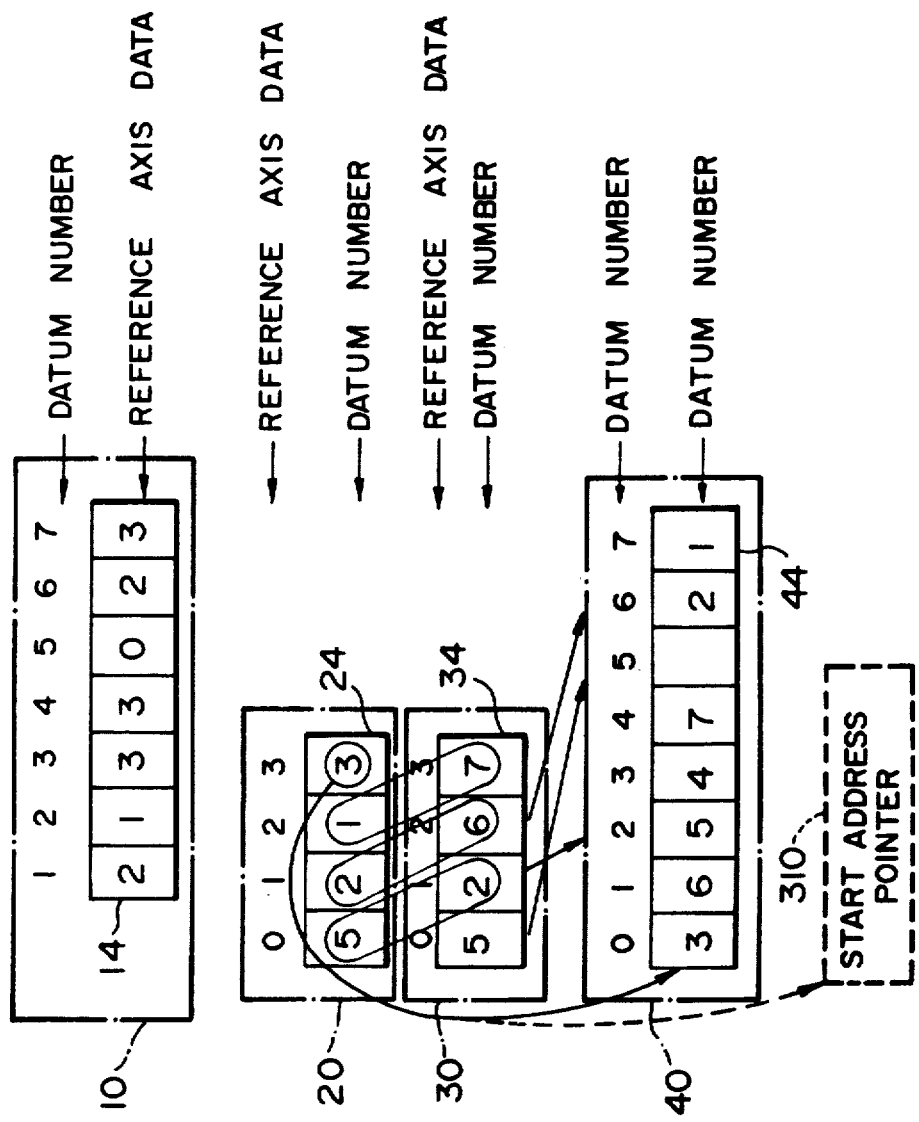
FIG. 20 illustrates the transfer of data from the first and last buffer memories to the chain buffer memory when the data are to be sorted in the descending order.

FIG. 20 shows a transfer of data from the first and last buffer memories 20 and 30 to the chain buffer memory 40 when the data are sorted in the descending order.

In the sorting operation in the descending order, data begin to be transferred while at the same time the datum number storage areas 24 are searched in the order starting from the largest address. If a desired datum number is found in a storage area 24, it is read out therefrom as a start address and then written into the address zero of the chain datum number storage areas 44.

If it is wanted to use the address zero of the storage areas 44 in the other application, said start address may be set in the start address pointer 310, as shown by dotted-line in FIG. 20.

As the datum number storage areas 24 are searched in the order starting from the largest address (largest reference-axis datum), it is detected that the desired datum number has been written in a storage area 24 specified by an address "3". As shown in FIG. 20, this datum number "3" is then written into a chain datum number storage area 44 specified by the address zero.

If it is desired to use the storage area 44 having the address "0" in the other application, the datum number will be set in the start address pointer 310.

By using, as an address, the datum number of the reference-axis datum "3" when it lastly appears, the datum number of the smaller reference-axis datum "2" when it initially appears is then written into the corresponding chain datum number storage area 44.

In order to do so, the datum number "7" of the last datum number storage area 34 specified by the address "3" is read out as a write address. The datum "1" of the first datum number storage area 24 specified by the address "2" is written into the chain datum number storage area 44 specified by the address "7".

By similarly using, as a write address, the datum number of the reference-axis datum "2" when it lastly appears, the datum number of a smaller reference-axis datum "1" when it initially appears is then written into the corresponding chain datum number storage area 44.

In order to perform such a writing, the datum number "6" of the last datum number storage area 34 specified by the address "2" is read out as a write address. At the chain datum number storage area 44 specified by this address "6" there may be written the datum "2" in the first datum number storage area 24 specified by the address "1".

By similarly using, as a write address, the datum number "2" of the reference-axis datum "1" when it lastly appears, the datum number "5" of the reference-axis datum "0" when it first appears is written into the corresponding chain datum number storage area 44.

On completion of such a series of data transferring and writing operations, datum numbers used as read-out addresses for the reference-axis data memory 10 are sequentially outputted from the chain buffer memory 40 in accordance with a predetermined read-out rule.

In the present embodiment, a read-out start address has been stored in the chain datum number storage area 44 specified by the address "0". For such a purpose, the address "0" is set in the address pointer 42. Thus, the datum number "3" stored at the address "0" of the datum number storage areas 44 will be read out therefrom as a read-out start address.

If a datum number is read out from the corresponding datum number storage area 44 in such a manner, it is then set in the address pointer 42.

Therefore, the next datum number "4" is read out from the datum number storage area 44 specified by the address "3". The read datum number is newly set at the address pointer 42.

As the datum numbers are sequentially read out in accordance with such a read-out rule, they will be sequentially outputted from the chain datum number storage areas 44 in the following order:

3→4→7→1→6→2→5.

If the datum numbers thus read out are used as data read-out addresses for the reference-axis data memory 10, the reference-axis data will be sequentially outputted from the reference-axis data memory 10 while being sorted in the descending order:

3→3→3→2→2→1→0.

(III) Summary for Sorting Operations in the Ascending and Descending Orders

In either of the ascending or descending order, the sorting system of the present invention sorts the reference-axis data by using the datum numbers assigned to the reference-axis data rather than the reference-axis data themselves. Even if the reference-axis data are increased in the number of bits, the sorting operation can be performed simply at high speed without being affected by the increased number of bits.

In accordance with the present invention, particularly, the sorting operation of reference-axis data can be greatly reduced in both the number of data transfers and the number of data to be processed in comparison with the prior art technique in which a reference-axis datum is compared with all the other reference-axis data, all the reference-axis data being re-arranged based on the result from each of the comparisons and such comparing and re-arranging operations being repeated for each of the reference-axis data. Therefore, the transferring operation of reference-axis data can be performed by the use of a simplified circuit at very high speed.

Although the first embodiment of the present invention has been described as to four reference-axis data 0–3, it is not limited to such a case and can be similarly operated to make the sorting operation even if one of these reference-axis data, for example, a reference-axis datum "1" is absent. In this case, even if the transfer of data from the reference-axis data memory 10 to the first and last buffer memories 20 and 30 has been terminated, no datum number will be written into the datum number storage area 24 or 34 of each of the buffer memories 20 and 30 which is specified by the address "1".

As in the sorting operation in the ascending order, thus, the datum number "5" of the reference-axis datum "0" when it is lastly outputted may be used as an address for writing the datum number "1" of the larger reference-axis datum, that is, the reference-axis datum "2" when it initially appears, when the transfer of data is to be made from each of the buffer memories 20 and 30 to the chain buffer memory 40. The subsequent data-writing operation can be performed in the same manner as shown in FIG. 3.

Second Embodiment

Figure 21:
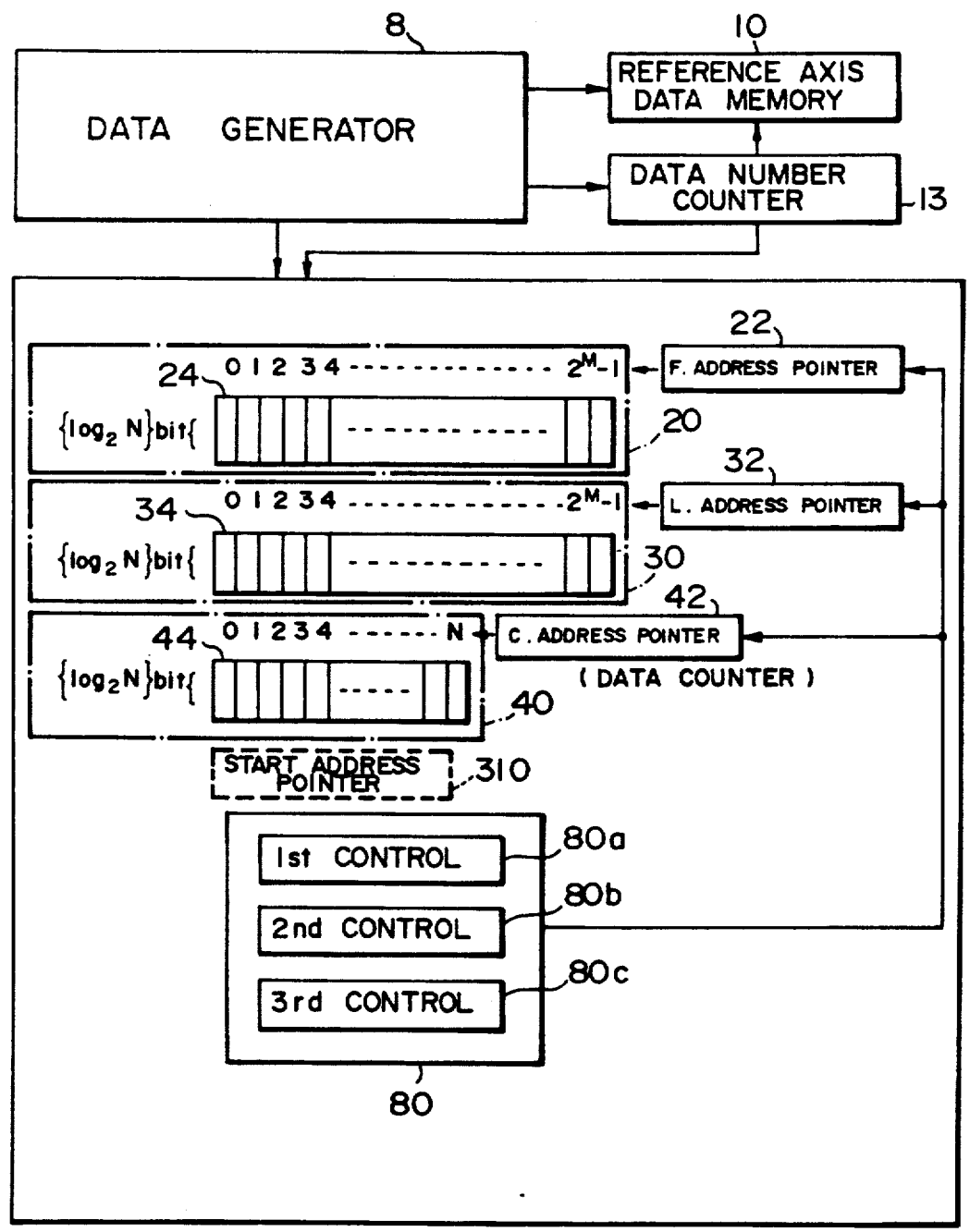
FIG. 21 is a view showing a second preferred embodiment of the present invention.

FIG. 21 shows a second preferred embodiment of the present invention.

The first embodiment of the present invention is explained as to the datum number pointer 12 of the reference-axis data memory 10 as datum number generating means. On the contrary, the second embodiment of the present invention is characterized by that it utilizes a datum number generating counter 13 as datum number generating means in place of the datum number generator 12.

More particularly, as reference-axis data to be sorted are sequentially outputted from the external data generator 8, these reference-axis data are sequentially written and stored in the reference-axis data memory 10 as in the first embodiment. At the same time, the reference-axis data are inputted into the datum number counter 13, the first buffer memory 20 and the last buffer memory 30.

At each time when a reference-axis datum is inputted to the datum number counter 13, the latter generates the corresponding datum number. In the illustrated embodiment, the datum numbers are outputted from the datum number counter 13 in the order of 0, 1, 2 . . . ($2^M - 1$) in synchronization with the input of the reference-axis data.

The datum number from the datum number counter 13 is written into each of the storage areas 24 and 34 of the first and last buffer memories 20 and 30 by using the corresponding reference-axis datum from the data generator 8 as a write address, as in the first embodiment. At the same time, the datum also is written into the chain buffer memory 40, as in the first embodiment.

On termination of the data transfer to the respective buffer memories 20, 30 and 40, the writing of reference-axis data into the reference-axis data memory 10 also has been terminated. Thereafter, the transfer of data from the first and last buffer memories 20 and 30 to the chain buffer memory 40 is initiated, as in the first embodiment.

On completion of such a data transfer, the chain buffer memory 40 will store the datum numbers to cause the reference-axis data to chain with each other in the ascending or descending order.

The third control 80c reads out the datum numbers written in the chain datum number storage areas 44 in accordance with a predetermined read-out rule. The read-out operation can be controlled such that the reference-axis data can be read out from the reference-axis data memory 10 in the order represented by the datum numbers of the data thus read out. In such a manner, the reference-axis data can be sorted in and outputted from the reference-axis data memory 10 in the ascending or descending order.

The second embodiment can sort the reference-axis data at a speed higher than that of the first embodiment since the writing of reference-axis data into the reference-axis memory 10 can be performed parallel to the sorting of reference-axis data.

Thus, the second embodiment can sort and output the reference-axis data in the ascending or descending order, as in the first embodiment.

Third Embodiment

Although the first and second embodiments have been described as to the sorting of inputted reference-axis data, the present invention is not limited to such a case and may be similarly used to sort sorting data including reference-axis data and information combined therewith (information paired with reference-axis data).

Figure 19:
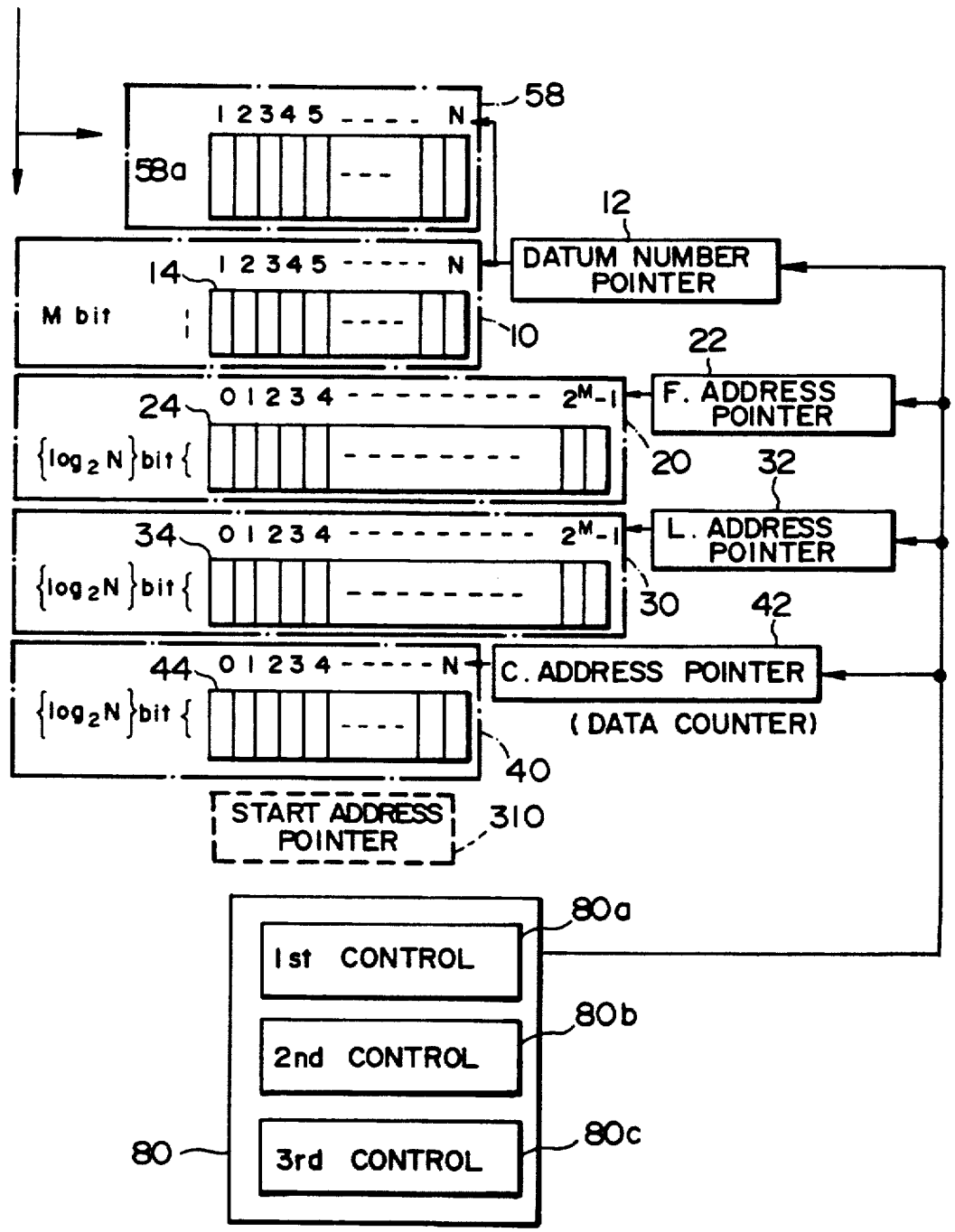
FIG. 19 is a view showing a third preferred embodiment of the present invention.

FIG. 19 shows a third preferred embodiment of the present invention in which sorting data including such combined information are sorted based on information of reference-axes. The circuit of the third embodiment may be constructed of either of the first or second embodiment. However, it will be described herein that the circuit is formed by the use of the first embodiment's circuit.

The sorting circuit of the third embodiment comprises the reference-axis data memory 10 and an information memory 58. The sorting circuit is designed such that reference-axis data included in sorting data from the data generator 8 are stored in the reference-axis data memory 10 and a section of information paired with each of the reference-axis data is stored in the information memory 58.

The reference-axis data memory 10 has combined-information storage areas 58a equal in number to at least a total of N which include 1 through N and which are specified by the datum number pointer 12.

As a plurality of reference-axis data to be sorted are inputted into the sorting circuit from the external data generator 8, the reference-axis data are assigned by datum numbers 1 to N in the order in which they are sequentially inputted therein. The reference-axis data and their combined information are sequentially written into the reference-axis data storage areas 14 specified by the datum number pointer 12 in the order from 1 to N and the combined-information storage areas 58a.

As the sorting data are externally inputted into the sorting circuit of the third embodiment, the reference-axis data and their combined information will be sequentially written into each of the storage areas 14 and 58a specified by the datum number pointer 12 in a predetermined relationship.

If the reference-axis data stored in the reference-axis data memory 10 are sorted in the same manner as in the first embodiment, the datum numbers will be stored in the chain buffer memory 40 at its chain datum number storage areas to cause the reference-axis data to chain with each other in the ascending or descending order.

When the datum numbers thus stored in the chain datum number storage areas 44 are read out as in the first embodiment and if the combined information is read out from the information memory 58 in the order following the datum numbers read out, a series of combined information sections can be sorted in and outputted from the information memory 58 based on the reference-axis data in the ascending or descending order.

It will be apparent from the foregoing that the third embodiment can require less time to sort the data using the reference-axis data memory 10 and the buffer memories 20, 30 and 40 even if the amount of information of the sorting data themselves is increased. Therefore, the sorting operation can be performed efficiently over a reduced time period even though the amount of information per one sorting data unit is very much.

Fourth Embodiment

Figure 22:
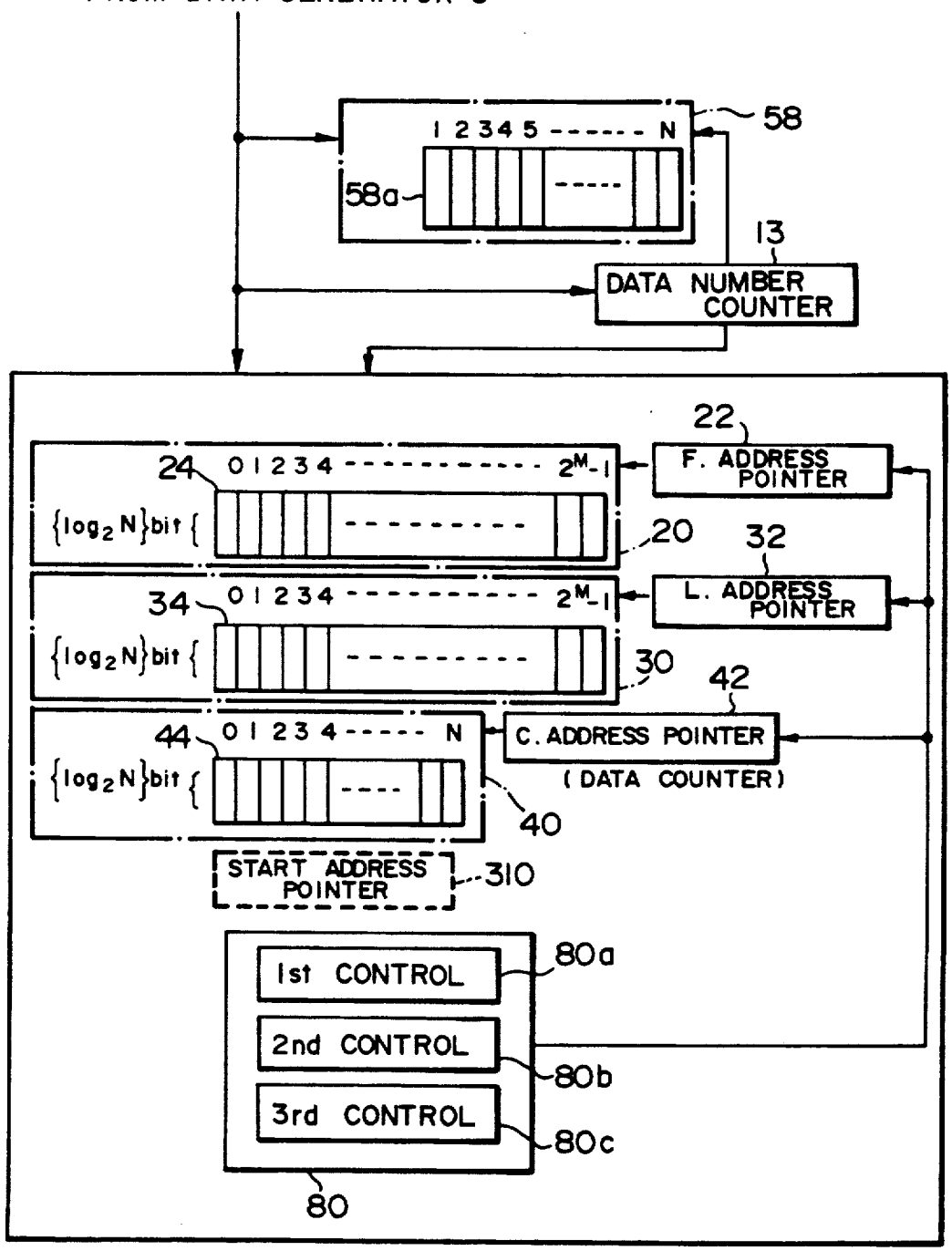
FIG. 22 is a view showing a fourth preferred embodiment of the present invention.

FIG. 22 shows a fourth preferred embodiment of the present invention. Although the third embodiment has been described as to the sorting circuit formed by the circuit of the first embodiment and for sorting the sorting data including combined information based on the reference-axis data, the fourth embodiment is characterized by that it is formed by utilizing the circuit constructed according to the aspect of the second embodiment. Parts corresponding to those of the previous embodiments are denoted by the similar reference numeral and will not be described further.

The sorting circuit of the fourth embodiment comprises the information memory 58 and the circuit shown in the second embodiment. The sorting circuit does not have the reference-axis data memory 10.

Reference-axis data included in the sorting data from the external data generator 8 are inputted into the datum number counter 13 and the respective buffer memories 20 and 30 while a combined information section paired with each of the reference-axis data is sequentially stored in the information memory 58, as in the third embodiment.

As each of the reference-axis data is inputted into the sorting circuit, each of the buffer memories 20, 30 and 40, datum number counter 13 and sorting control circuit 80 may operate the same manner as in the second embodiment. Therefore, datum numbers will be stored in the chain datum number storage areas 44 of the chain buffer memory 40 to cause the reference-axis data to chain with each other in the ascending or descending order.

The third control 80c is operative to read out the datum numbers stored in the chain datum number storage areas 44, as in the first embodiment. The combined information sections are then read out from the information memory 58 in the order following the datum numbers thus read out. Thus, a series of combined information sections will be sorted in and outputted from the information memory 58 in the ascending or descending order, based on the reference-axis data.

Fifth Embodiment

Figure 23:
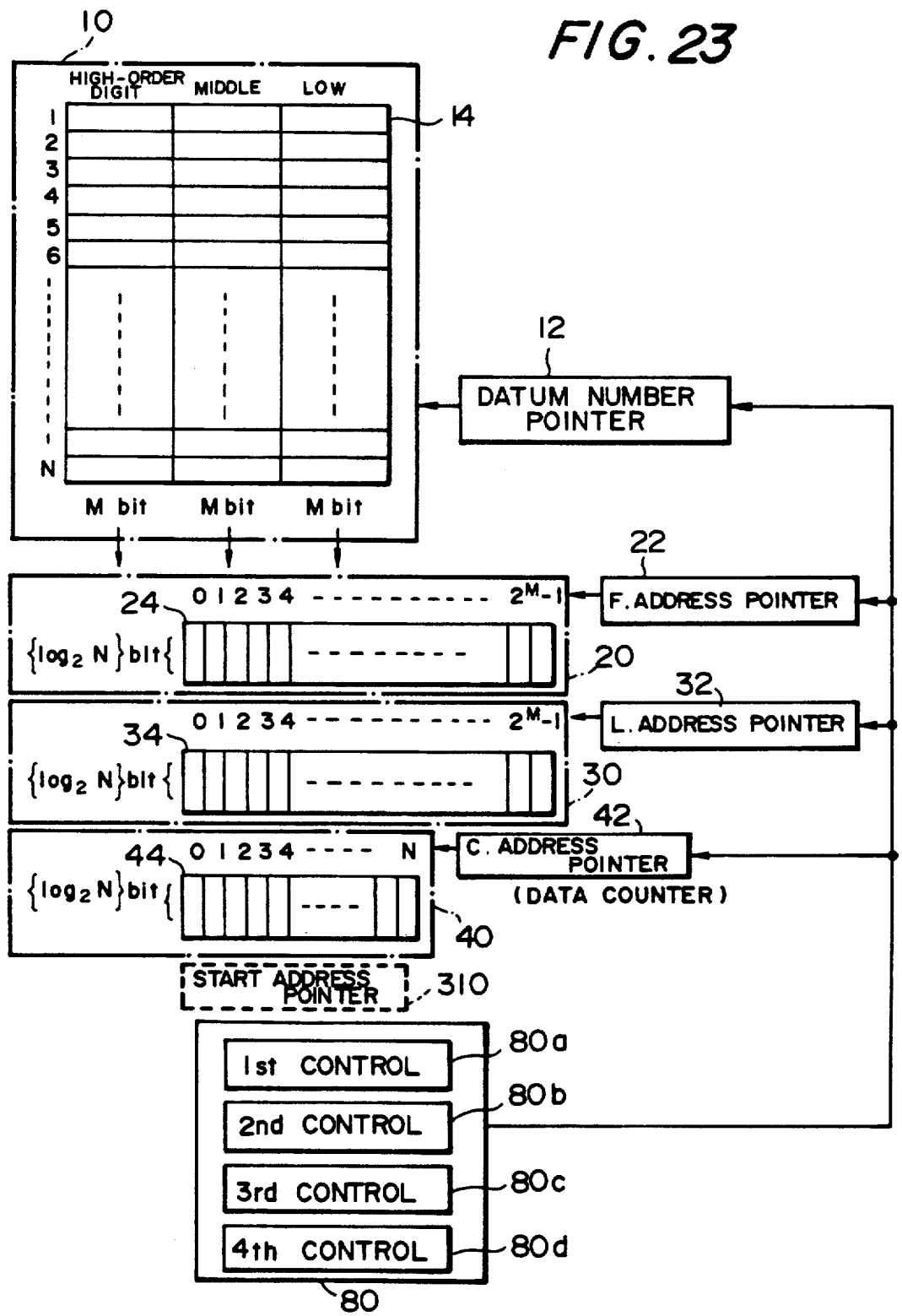
FIG. 23 is a view showing a fifth preferred embodiment of the present invention.

FIG. 23 shows a fifth preferred embodiment of the present invention which is a modification of the first embodiment.

The fifth embodiment is characterized by that even if the number of digits included by each of the reference-axis data stored in the reference-axis data memory 10 is increased, a high-speed sorting operation can be made for the reference-axis data without increase of the capacity in each of the buffer memories 20 and 30.

In the fifth embodiment, the reference-axis data memory 10 has reference-axis data storage areas 14 each addressed by the corresponding datum number. The fifth embodiment comprises a pair of chain buffer memories 40 one of which receives data to be written thereinto while reading data out of the other memory 40. The reference-axis data from the data generator 8 are sequentially written and stored in the respective storage areas 14 in the order following the datum numbers thereof. In the fifth embodiment, the sorting circuit is such that each reference-axis datum comprising 3M bits can be written into the corresponding storage area 14.

On completion of the writing of reference-axis data into the reference-axis data memory 10 in such a manner, the reading-out of reference-axis data from the reference-axis data memory 10 is then initiated.

The fifth embodiment is further characterized by that 3M bits forming each of the reference-axis data are divided into a plurality of searched digits. A reference-axis datum can be read out from the reference-axis data memory 10 for each searched unit.

On termination of the writing of reference-axis data into the reference-axis data memory 10, lower M-bit data are sequentially read out from the reference-axis data memory 10 in the order following the datum number 1 to N and then supplied to the first and last buffer memories 20 and 30.

The lower M-bit datum of each of the reference-axis data thus read out is then sorted and processed in the same manner as in the first embodiment. At this time, the writing of data is performed to one of the chain buffer memories 40. Therefore, datum numbers will be written into the chain datum number storage areas 44 of said one chain buffer memory 40 to cause the lower M-bit data of the reference-axis data to chain with each other in the ascending or descending order.

The fourth control 80d is operative to read out the datum numbers written into the chain datum number storage area 44 of said one chain buffer memory 40 in accordance with a predetermined read-out rule, as in the first embodiment. Middle M-bit data of the reference-axis data from the reference-axis data memory 10 are then read out and supplied to the respective buffer memories 20 and 30 in the order following the datum numbers thus read out.

The middle M-bit data or the reference-axis data thus read out are sorted similarly. At this time, the writing of data is made to the other chain buffer memory 40. Thus, the datum numbers will be written into the chain datum number storage areas 44 of the other chain buffer memory 40 to cause the middle M-bit data of the reference-axis data to chain with each other in the ascending or descending order.

The fourth control 80d also is operative to read out the datum numbers written into the chain datum number storage areas 44 of the other chain buffer memory 40 in accordance with a predetermined read-out rule. Higher M-bit data of the reference-axis data are read out from the reference-axis data memory 10 and then supplied to the respective buffer memories 20 and 30 in the order following the datum numbers thus read out.

The higher M-bit data of the reference-axis data supplied to the buffer memories 20 and 30 are similarly sorted. At this time, the writing of data is performed to one of the pair of chain buffer memories 40. Therefore, the datum numbers will be written into the chain datum number storage areas 44 of said one chain buffer memory 40 to cause the higher M-bit data of the reference-axis data to chain with each other in the ascending or descending order.

In such a manner, a given digit in the reference-axis datum can be set as a searched digit (digit consisting of M-bit data in the fifth embodiment) and the sorting operation of reference-axis data based on each searched digit can be repeated while shifting the searched digit from the lowest searched digit toward the highest searched digit. Thus, the datum numbers will be written into the chain datum number storage areas 44 to cause the reference-axis data to chain with each other in the ascending or descending order when the process for sorting the reference-axis data based on the highes searched digit is terminated.

After the sorting of reference-axis data based on the highest searched digit has been terminated, the third control 80c reads out the datum numbers written into the chain datum number storage areas 44 in accordance with a predetermined read-out rule. The reading-out operation is controlled to output the reference-axis data from the reference-axis data memory 10 in the order following the datum numbers thus read out.

Even if the reference-axis data memory 10 is constructed of many digits, therefore, the sorting circuit can be of a simplified construction and yet perform its sorting operation at high speed without increase of the capacity in each of the buffer memories 20, 30 and 40.

Figure 24:
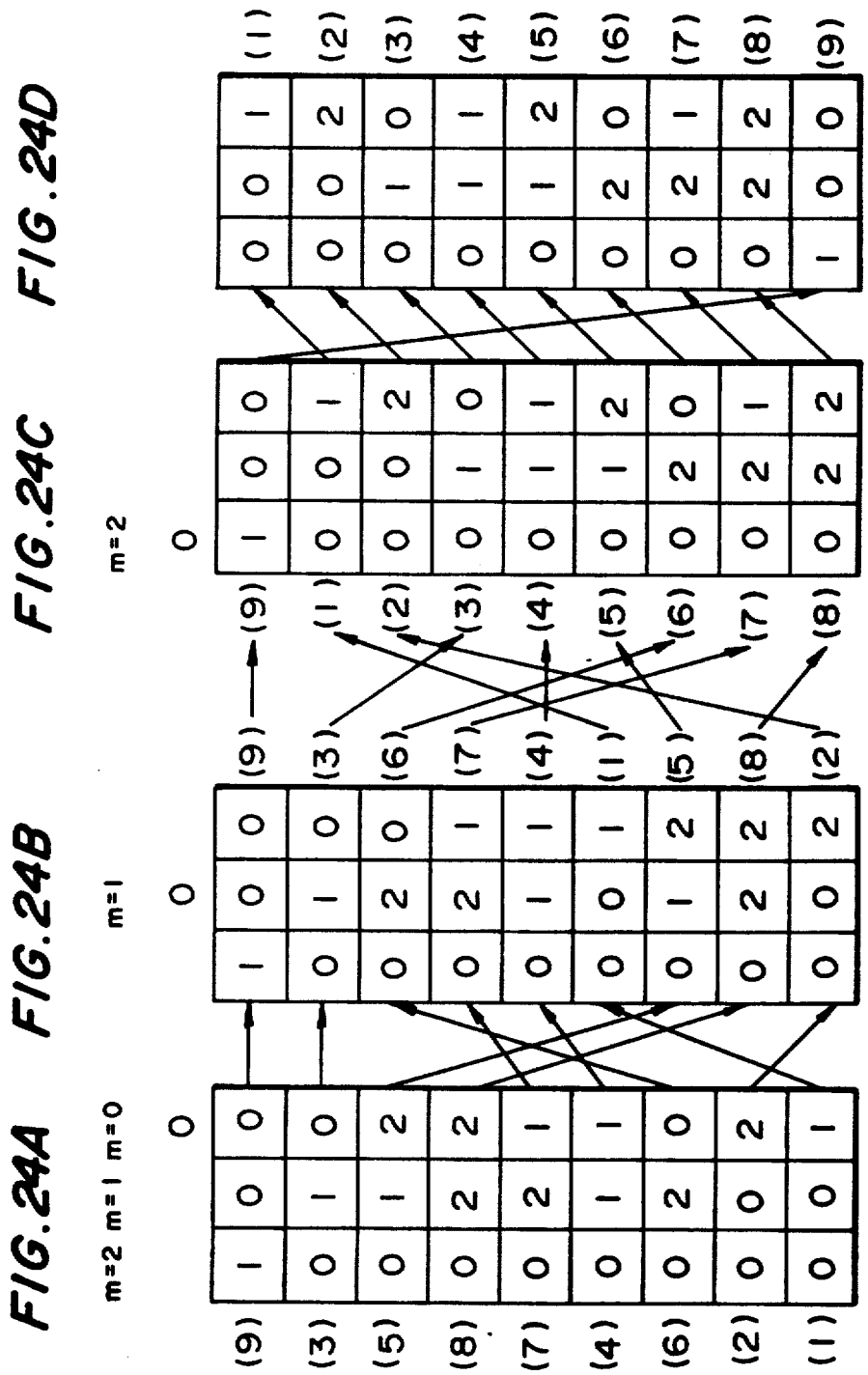
FIGS. 24A, 24B, 24C and 24D together illustrate the operation of the sorting circuit of the present invention shown in FIG. 23.

The sorting of reference-axis data in the ascending order will now be described in connection with FIG. 24. For simplification, it is assumed that a reference-axis datum consisting of ternary figures is sorted one digit at a time starting the lowest digit.

It is also assumed that reference-axis data are stored in the reference-axis data memory 10 as shown in FIG. 24A.

When a first sorting operation is initiated for the reference-axis data thus stored, a variable m representative of searched digit is first set into "0". Subsequently, searched digits which have their values corresponding to m=0 are read out from the reference-axis data memory 10 in the order following their datum numbers and subjected top the sorting process as described previously. Thus, the datum numbers will be stored at the chain datum number storage areas 44 to chain the searched digits of the reference-axis data corresponding to m=0 with each other in the ascending order.

The datum numbers written in the chain datum number storage areas 44 are then read out therefrom in accordance with a predetermined read-out rule. Searched digits of the reference-axis data corresponding to m=1 are then read out from the reference-axis data memory 10 in the order following the datum numbers thus read out. The sequence of the reference-axis data read out from the reference-axis data memory 10 is shown in FIG. 24B. It will be apparent from this figure that the searched digits of the reference-axis data corresponding to m=1 are sorted and read out based on the searched digits corresponding to m=0 in the ascending order.

If these searched digits corresponding to m=1 are similarly subjected to the sorting process, their datum numbers will be stored in the chain datum number storage areas 44 to chain the searched digits of the reference-axis data corresponding to m=1 in the ascending order. By reading searched digits of the reference-axis data corresponding to m=2 from the reference-axis data memory 10 based on the datum numbers which have been written in the chain datum number storage areas 44, the searched digits of the reference-axis data corresponding to m=2 can be read out from the reference-axis data memory 10 in such an order as shown in FIG. 24C.

If the sorting process is repeated while shifting the searched digits one at a time from the lowest digit to the highest digit in the reference-axis data and when the sorting process for the highest searched digit corresponding to m=2 is terminated, the datum numbers can be written into the chain datum number storage areas 44 to chain the reference-axis data with each other in the ascending order, as shown in FIG. 24D.

After the highest searched digit corresponding to m=2 has been subjected to the sorting process, therefore, the third control 80c will read out the datum numbers written in the chain datum number storage areas 44 in a predetermined read-out sequence and then the reference-axis data from the reference-axis data memory 10. In such a manner, the reference-axis data can be sorted in and read out from the reference-axis data memory 10 in the ascending order, as shown in FIG. 24D.

Although reference has been made to the reference-axis data sorted in the ascending order, the reference-axis data may be sorted and outputted in the descending order by repeating the sorting process for the searched digits in the descending order.

Although the fifth embodiment of the present invention has been described as to two chain buffer memories 40, it is to be understood that the present invention is not limited to such an arrangement of two chain buffer memories. A single chain buffer memory may be provided such that after datum numbers written in said chain buffer memory have been once transferred to any other memory, the datum numbers are then read out from the other memory in accordance with a predetermined read-out rule. The M-bit data of a given searched digit may be read out from the reference-axis data memory 10 and transferred to the respective buffer memories 20 and 30 in the order following the datum numbers thus read out. Thus, the single chain buffer memory 40 is sufficient to process the data in the fifth embodiment, but the sorting speed of data is decreased.

Sixth Embodiment

Figure 25:
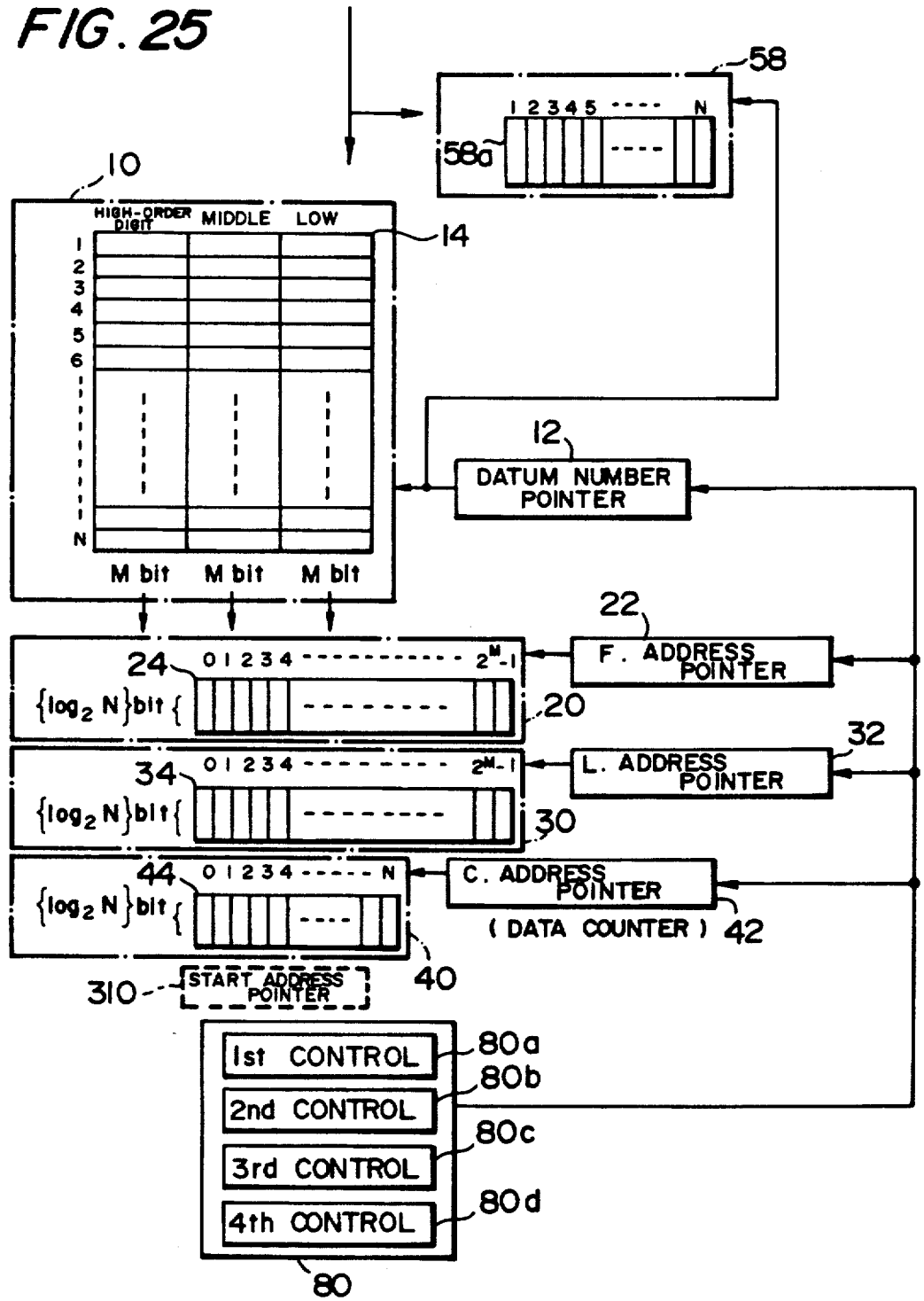
FIG. 25 is a view showing a sixth preferred embodiment of the present invention.

FIG. 25 shows a sixth preferred embodiment of the present invention. Although the third embodiment has been described as to the sorting circuit formed by the use of the circuit in the first embodiment and for sorting the sorting data including the combined information based on the reference-axis data, the sixth embodiment is characterized by that it comprises a sorting circuit formed by the use of the circuit in the fifth embodiment.

The sorting circuit of the sixth embodiment comprises the information memory 58 and the circuit shown in the second embodiment.

Reference-axis data included in sorting data from the external data generator 8 are inputted into the reference-axis data memory 10 and then subjected to the sorting process as in the fifth embodiment. Thus, the datum numbers will be stored at the chain datum number storage areas 44 of the chain buffer memory 40 to chain the reference-axis data with each other in the ascending or descending order.

The third control 80c reads out the datum numbers stored in the chain datum number storage areas 44 as in the fifth embodiment. In the sequence following the datum numbers thus read out, the combined information will be then read out and controlled from the information memory 58. Thus, a series of combined information sections will be sorted in and outputted from the information memory 58 is the ascending or descending order, based on the reference-axis data.

Comparison of the Sorting Circuit of the Present Invention with the Prior Art The applicant had proposed another sorting circuit different from the sorting circuit of the present invention by Japanese Patent Application Sho 62-217044 dated on Aug. 31, 1987.

The sorting circuit relating to this previously filed patent application will be simply compared with the sorting circuit of the first embodiment of the present invention in time required to perform the sorting process.

If the number of reference-axis data to be sorted is equal in number to N and the number of bits in each of the reference-axis data is equal in number to M, a simple comparison between the present invention and the prior art with respect to the sorting time (access into RAM) will be result in:

First of all, the sorting time in the prior art sorting circuit can be represented by:

$$(4N+2) \times M + N + 4 \text{ cycles} \qquad (1).$$

Such a formula has been already described in the patent application previously filed by the applicant and will not further be explained herein.

If N is equal to 1023, M is equal to 15 bits and RAM access has a cycle steal equal to 6.144 MHz, the total processing time will be $$62437 \text{ cycles}/6.144 \text{ MHz} = 10.2 \text{ milliseconds}.$$

This is sufficient to fall in one field time (equal to about 16.5 milliseconds).

If the number of data is increased to provide N=2047 and M=15 bits, however, this processing time will be $$124901 \text{ cycles}/6.144 \text{ MHz} = 20.3 \text{ milliseconds}.$$

This processing time fails to fall in one field time.

The prior art sorting circuit has a disadvantage in that it will not be able to perform the sorting process within one field time if the number of data increases too much against the number of bits in the data to be sorted.

Particularly, a three-dimensional image synthesizer which will be described hereinafter tends to increase the number of data (systematically speaking, the number of displayed polygons). Therefore, the three-dimensional image synthesizer requires a sorting circuit which can be operated at higher speed.

The sorting circuit constructed according to the present invention can satisfy such a requirement. Considering the sorting time simply under the same condition, it can be given as follows.

First, the reference-axis data memory 10 requires the number of cycles equal to N since all the reference-axis data must be read out therefrom at once.

Next, the first buffer memory 20 requires the number of cycles equal to N in writing data and the number of cycles equal to $2^M$ in reading out for transfer of data to the chain buffer memory 50.

The last buffer memory 30 requires the number of cycles equal to N in reading out for checking the data, the number of cycles equal to N in writing the data and the number of cycles equal to $2^M$ in transferring the data to the chain buffer memory 40.

The chain buffer memory 40 requires the number of cycles equal to N for writing the data.

Further, in order to clear the contents of the first and last buffer memories 20 and 30 prior to the writing of data into the respective buffer memories, the first buffer memory 20 requires the number of cycles equal to N for clearing and the last buffer memory 30 also requires the number of cycles equal to N for clearing.

On summary, the total number of cycles required to make the sorting process will be $$7 \times N + 2 \times 2^M \qquad (2).$$

If it is assumed that the number of bits M in the reference-axis data to be stored is equal to 15 and the number of reference-axis data N is changed from one to another and when the sorting time is calculated based on said formulas (1) and (2), the sorting times in the prior art sorting circuit and the sorting circuit of the present invention are represented by the following table.

TABLE I

| | The number of cycles at M = 15 | |
|---|---|---|
| Number of Data N | Sorting Circuit of the Prior Art | Sorting Circuit of the Invention |
| 255 | 15589 | 67321 |
| 511 | 31205 | 69113 |
| 1023 | 62437 | 72697 |
| 2047 | 124901 | 79865 |
| 4095 | 149829 | 94201 |
| 8191 | 499685 | 122873 |

It will be apparent from the above table that if the number of reference-axis data to be sorted is smaller, the sorting circuit of the prior art can be reduced in processing time. As the number of reference-axis data to be sorted increases, however, the sorting circuit of the present invention can greatly decrease the processing time.

Therefore, the present invention can very greatly reduce the sorting time to provide a sorting operation at higher speed as the number of reference-axis data increases.

Applications

As will be apparent from the foregoing, the sorting circuit of the present invention can sort many number of reference-axis data at higher speed. Even if the reference-axis data are combined with various types of information to provide the increased amount of sorting data, these sorting data can be sorted at higher speed based on the reference-axis data. Therefore, the present invention can be utilized in various types of applications such as a sorting operation for sorting data base information based on reference-axis data including data and so on.

Concrete Arrangement

Figure 5:
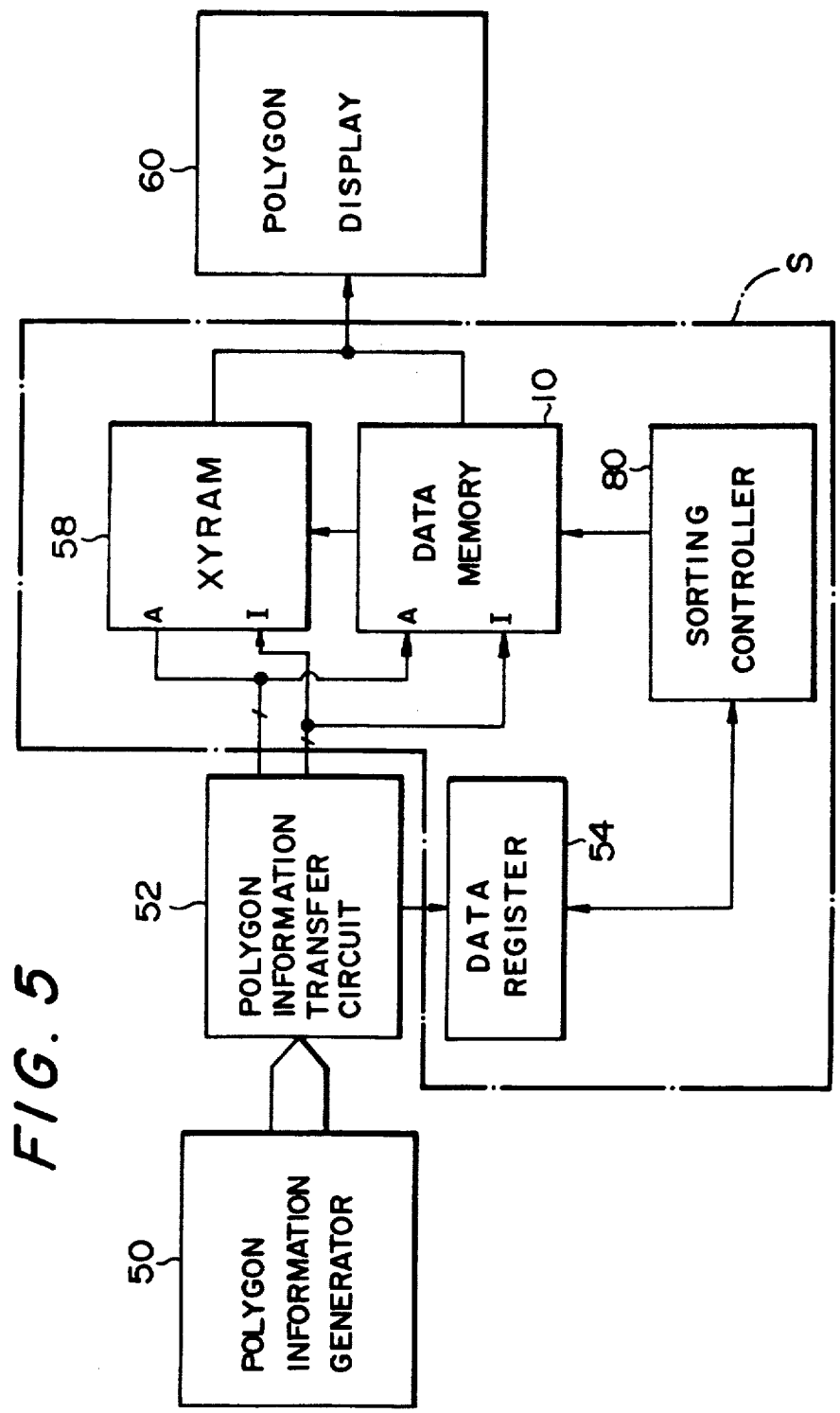
FIG. 5 is a block diagram of a three-dimensional image synthesizer to which the sorting circuit of the present invention is applied.

FIG. 5 shows a concrete and presently preferred arrangement of a three-dimensional image synthesizer to which the present invention is applied. The three-dimensional image synthesizer comprises a polygon information generating circuit 50, a polygon information transferring circuit 52, a sorting circuit S and a polygon display circuit 60. The polygon display circuit 60 is adapted to synthesize and display a two-dimensional stereo-image, that is, pseudo three-dimensional image on its CRT.

The polygon information generating circuit 50 is adapted to handle the three-dimensional information in various conversions such as revolution, translation, seeing-through, projection and so on. Thus, three-dimensional information to be displayed will be converted into information relating to a combination of two-dimensional polygons. Vertexes in each of the polygons can be determined in coordinates (X, Y) to provide polygon information.

The polygon information generating circuit 50 also is adapted to calculate the points of the polygon to be displayed in the direction of depth, that is, Z-coordinate at the center of the polygon as polygon information. If required, the polygon information generating circuit 50 can further calculate the color and brightness of the polygon as attendant information.

For simplification, the system will be described as one which can calculate color information as attendant information.

Figure 6:
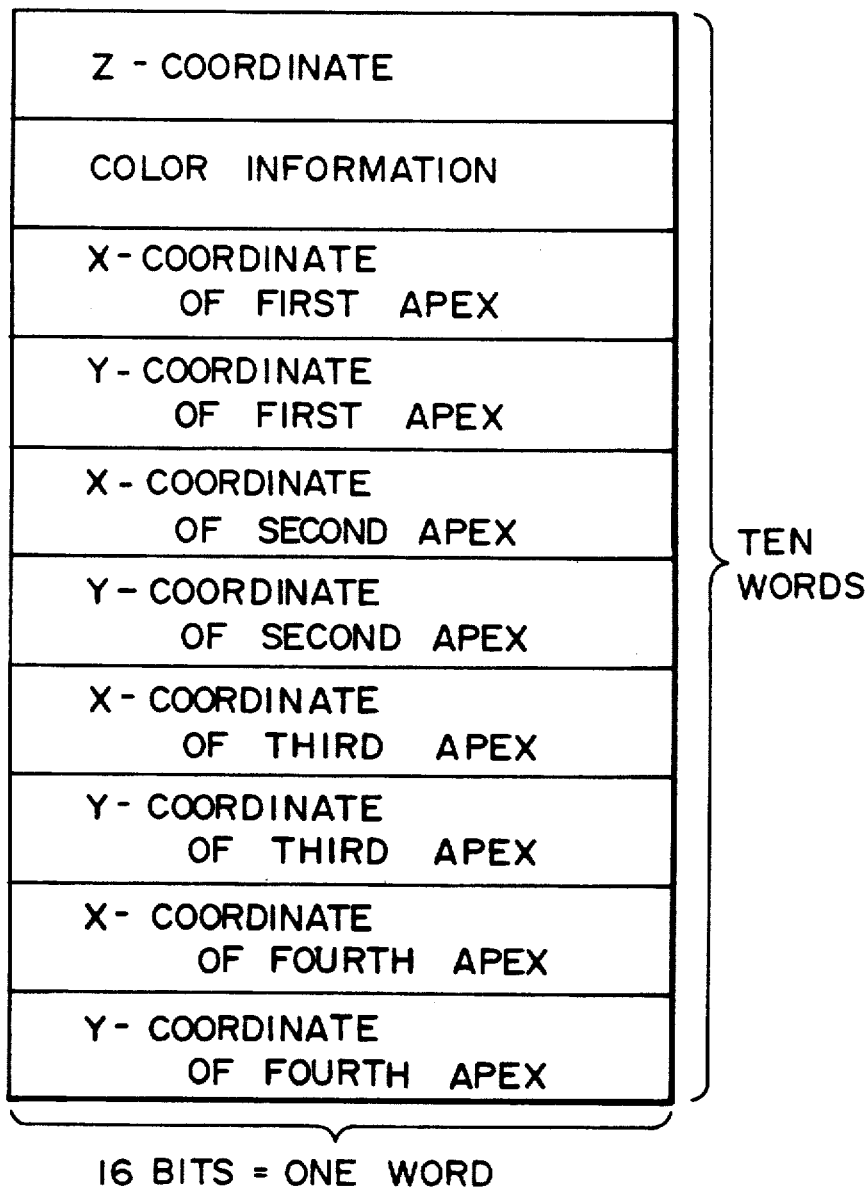
FIGS. 6 and 7 together illustrates the information of polygons which are calculated by and outputted from the polygon information generator shown in FIG. 5.
Figure 7:
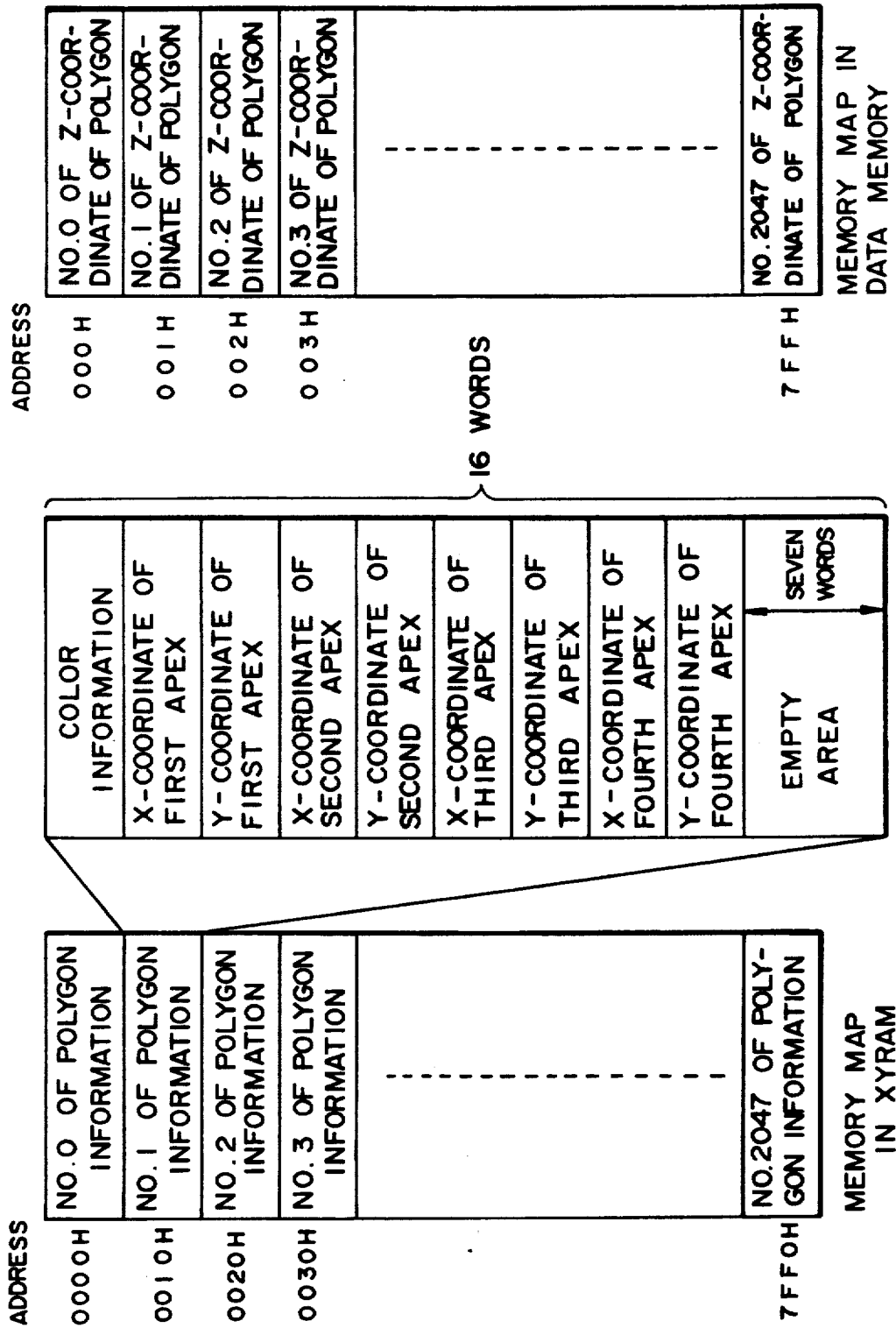

FIG. 6 shows polygon information of a polygon which is calculated is such a manner as described hereinbefore.

When the polygon information generating circuit 50 calculates polygon information sections of each of the polygons (that is, X- and Y-coordinates at the vertexes of the polygon, Z-coordinate at the center of the polygon and color information section), the polygon information transferring circuit 52 first separates the information sections of each polygon into Z-coordinate data and the other data. The Z-coordinate data are written into the reference-axis data memory 10 while the other data (combined information sections) are written into XYRAM 58.

At each time when the polygon information sections of each polygon are calculated in and outputted from the polygon information generating circuit 50, the Z-coordinates of these polygon information sections are sequentially inputted into the reference-axis data memory 10 while the polygon information sections other than the Z-coordinates are sequentially inputted into the XYRAM 58. At this time, a data register 54 counts the number of polygons outputted from the polygon information generating circuit 50 and also detects the number of the polygons displayed on each of raster scans.

Figure 8:
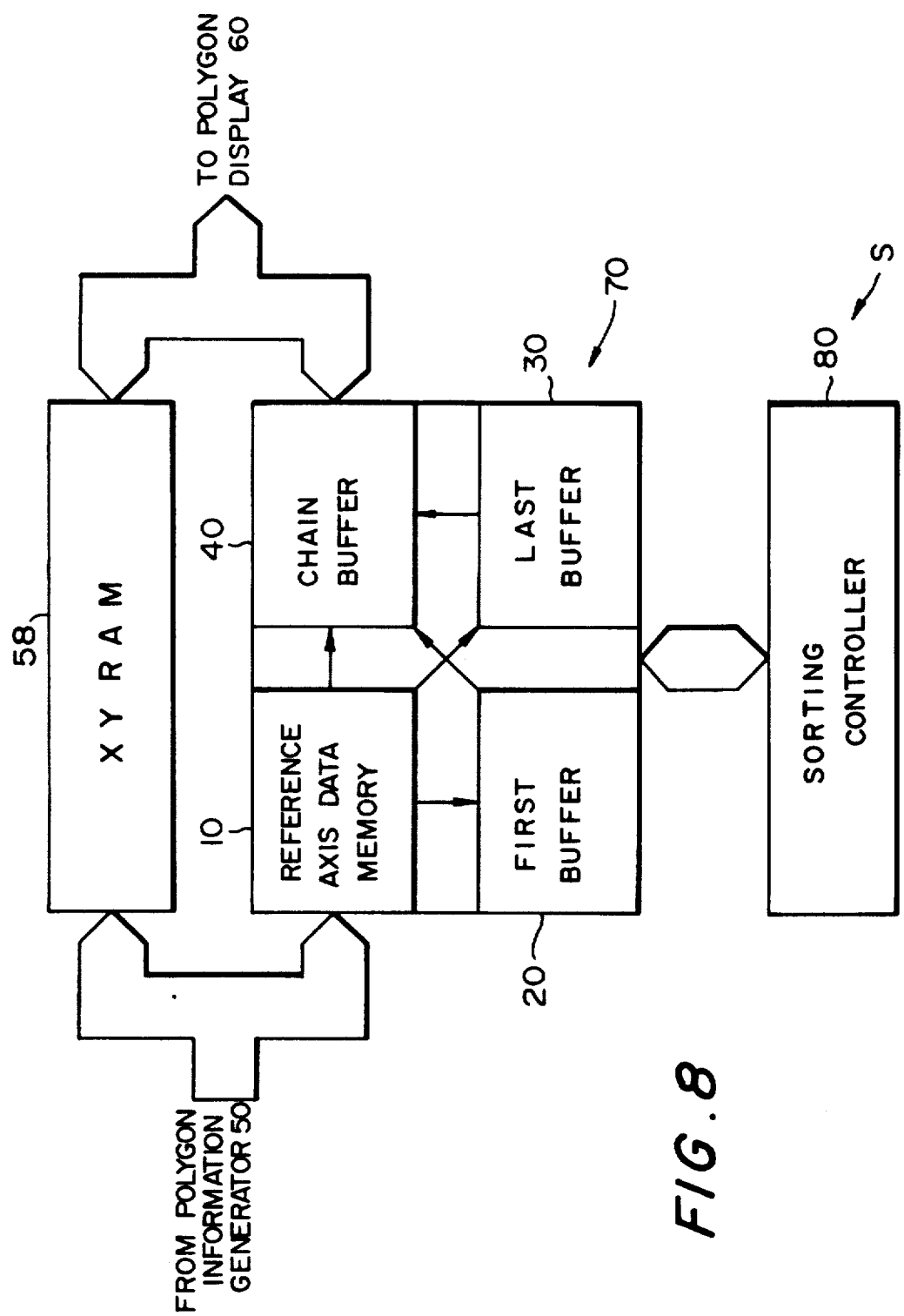
FIG. 8 is a block diagram of the sorting circuit of the present invention which is used in the three-dimensional image synthesizer shown in FIG. 5.

As best shown in FIG. 8, the sorting circuit S usable in the three-dimensional image synthesizer is adapted to sort a plurality of polygon information sections calculated for one scene on CRT in the ascending order starting from the smallest Z-coordinate with the sorted polygon information sections being then outputted therefrom to the polygon display circuit 60.

Figure 9:
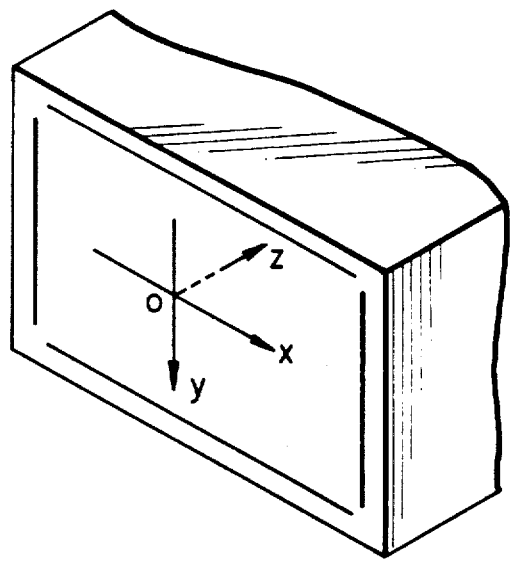
FIG. 9 is a view showing the concept of a three-dimensional image displayed by the use of the circuit shown in FIG. 5.

If a point on the CRT is used as a reference point and three-dimensional coordinates (X, Y and Z) are set to increase the Z-coordinate in the direction of depth as shown in FIG. 9, the sorting circuit S will perform its sorting operation in the order starting from polyton information sections relating to a polygon displayed forwardmost on the CRT, that is, a polygon having the highest priority.

When it is desired to display a plurality of polygons in an overlapping relationship, the polygon display circuit 60 synthesizes the polygon information sections of the polygons thus outputted from the sorting circuit S in the order following their priorities to form a three-dimensional image in which polygons having higher priorities are displayed forward over polygons having lower priorities.

Polygon Information Generating Circuit

Figure 10:
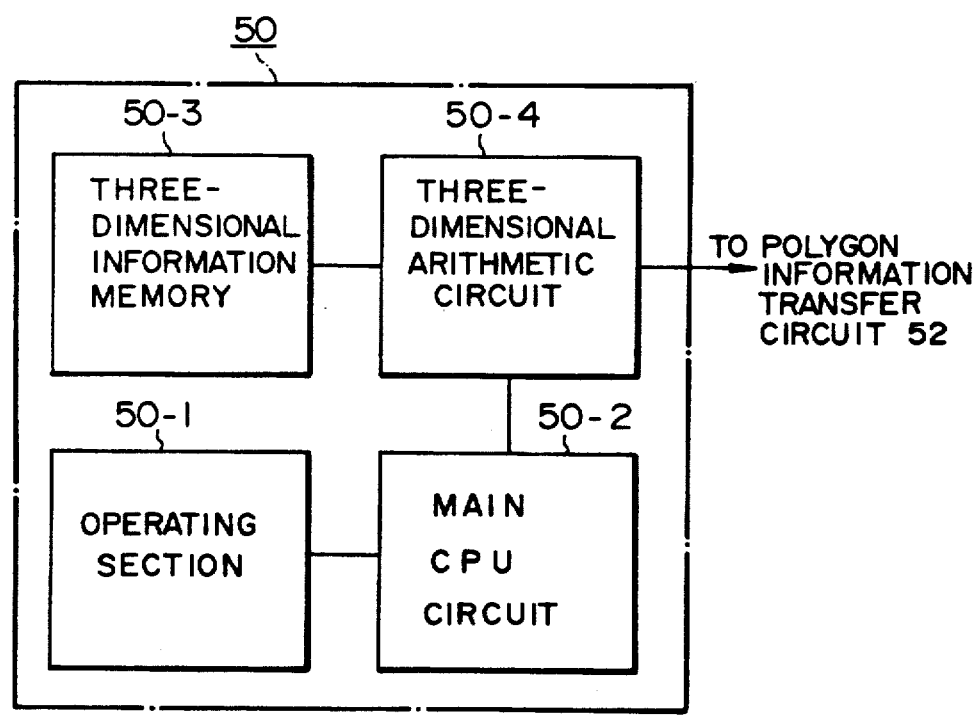
FIG. 10 is a block diagram of the concrete construction of the polygon information generator shown in FIG. 5.

FIG. 10 shows the concrete arrangement of a polygon information generating circuit 50 which is applied to an airplane simulating system and which is adapted to calculate and output images simulated in flight under various conditions.

The polygon information generating circuit 50 comprises a three-dimensional arithmetic circuit 50-4 which is adapted to imagine a moving coordinate system in which an airplane is the origin, and a main CPU circuit 50-2 for supplying moving coordinates representative of the actual position of the airplane.

As the three-dimensional arithmetic circuit 50-4 receives the moving coordinates from the main CPU circuit 50-2, the former initiates to read data relating to a given polygon from a three-dimensional information memory 50-3. Since the polygon information has been written in the three-dimensional information memory 50-3 with respect to a stationary coordinate system, the three-dimensional arithemetic circuit 50-4 is required to convert the information read out of the three-dimensional information memory 50-3 into the corresponding coordinate data in the moving coordinate system.

Such a conversion can be accomplished by combining two arithmetic elements with each other, that is, rotation and translation. During the conversion, information sections which are found to position out of a pilot's field of view (e.g. $Z<0$) can be eliminated. State data obtained by the conversion are then supplied to the main CPU circuit 50-2. The polygon information sections subjected to the conversion of coordinate are perspectively projected onto a viewpoint corresponding to $Z<0$ as if a scene being displayed is on a plane corresponding to $Z=0$.

Due to such a perspective projection, the data of each of the polygons can be represented as a group of information points each of which is formed by converting the coordinates of each vertex in that polygon into a two-dimensional coordinate point (X, Y).

Prior to the perspective projection, it is required to predetermine a distance between the viewpoint and each of the vertex coordinate points in the polygon.

The two-dimensional coordinate points determined from the perspective projection (that is, vertex coordinate points in the polygon) are classified into polygonal shapes representing the surface of the polygon. After classification, the polygon shapes are checked whether or not each of the polygon shapes is within the pilot's filed of view, that is, the field of view on the scene. Any polygonal shape which is completely out of the field of view will be eliminated.

Thereafter, the three-dimensional arithmetic circuit 50-4 determines the Z-coordinate point at the center of each of the polygonal shapes which can be ranged within an acceptable range of coordinates to be a typical value.

At the same time, the three-dimensional arithmetic circuit 50-4 calculates the attendant data (color data in the illustrated embodiment) of each of the polygonal shapes which can be within the acceptable range of coordinates.

The three dimensional arithmetic circuit 50-4 then outputs polygon information sections for each of the polygons thus obtained, that is, coordinates (X, Y) on each of the vertexes, central coordinate (Z) at the central point and color information in that polygonal shape.

The polygon information of each of the polygonal shapes outputted from the polygon information generating circuit 50 consists of 17 words with one word being used to represent the Z-coordinate at the central point. The remaining 16 words are utilized to represent the X- and Y-coordinates at each of the vertexes and color information in that polygonal shape.

One word comprises 16 bits.

In such a manner, the polygon information generating circuit 50 can convert state data placed within the pilot's field of view into a plurality of combined polygon information sections which in turn are sequentially supplied to the sorting circuit S.

If Z-coordinate points included therein has smaller values, they are displayed on the scene at more forward positions. It is therefore understood that Z-coordinate point having smaller values will have higher priorities. If the polygon information sections of each of the polygonal shapes outputted from the polygon information generating circuit 50 are sorted in the order starting from the smallest Z-coordinate value, the polygon display circuit 22 can synthesize a three-dimensional image simply and rapidly.

Sorting circuit

The sorting circuit of the present invention is characterized by that it can sort a plurality of data, based on preselected reference-axis data included therein.

FIG. 8 shows a concrete arrangement of the sorting circuit S constructed in accordance with the present invention.

The sorting circuit S comprises the reference-axis data memory 10 and the XYRAM 58 used as an information memory. Polygon information outputted from the polygon information generating circuit 50 and corresponding to one scene includes Z-axis information sections as reference-axis data which are written into the reference-axis data memory 10 and the other information sections which are written into the XYRAM 58.

In this arrangement, a group of sorting RAM's 70 are formed by the reference-axis data memory 10, the first buffer memory 20, the last buffer memory 30 and the chain buffer memory 40.

The sorting control circuit 80 is operative to control the write/read of data for the sorting RAM's 70 and to write the datum numbers of the reference-axis data into the chain buffer memory 40 to chain the reference-axis data with each other in the ascending order.

The datum numbers written into the chain buffer memory 40 are then read out in accordance with such a predetermined read-out rule as previously mentioned. Thereafter, the polygon information sections corresponding to one scene will be read out from the XYRAM 58 in the order following the datum numbers thus read out.

In such a manner, the sorting circuit shown in FIG. 8 can sort the polygon information sections outputted from the polygon information generating circuit 50 and corresponding to one scene in connection with their Z-coordinates in the ascending order and then send them to the polygon display circuit 60.

The concrete arrangement of the sorting circuit will now be described in more detail in connection with the sorting circuit of the third embodiment (shown in FIG. 19).

(a) First Control 80a

Figure 11:
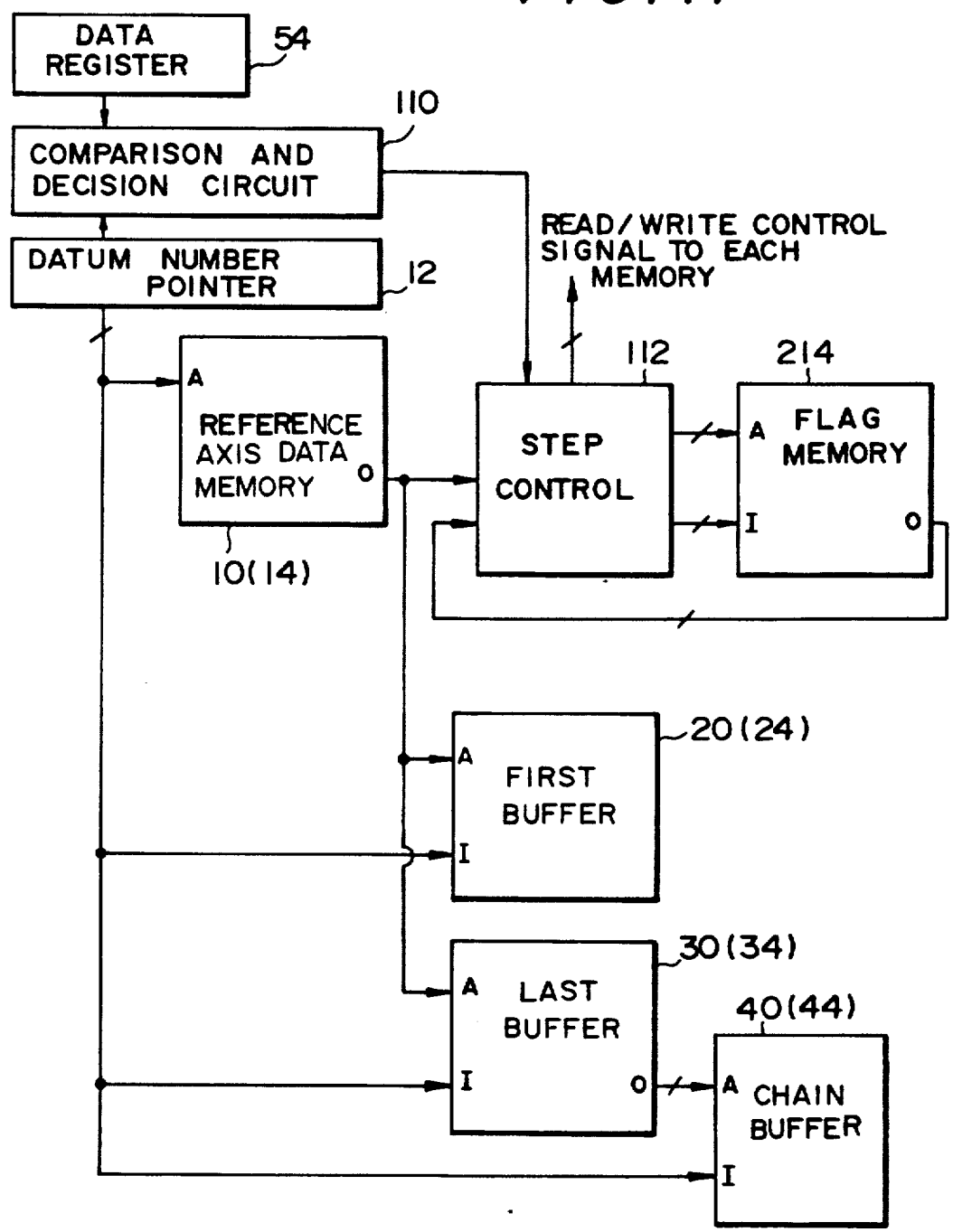
FIG. 11 is a block diagram of the arrangement of a sorting circuit constructed in accordance with the present invention.
Figure 12:
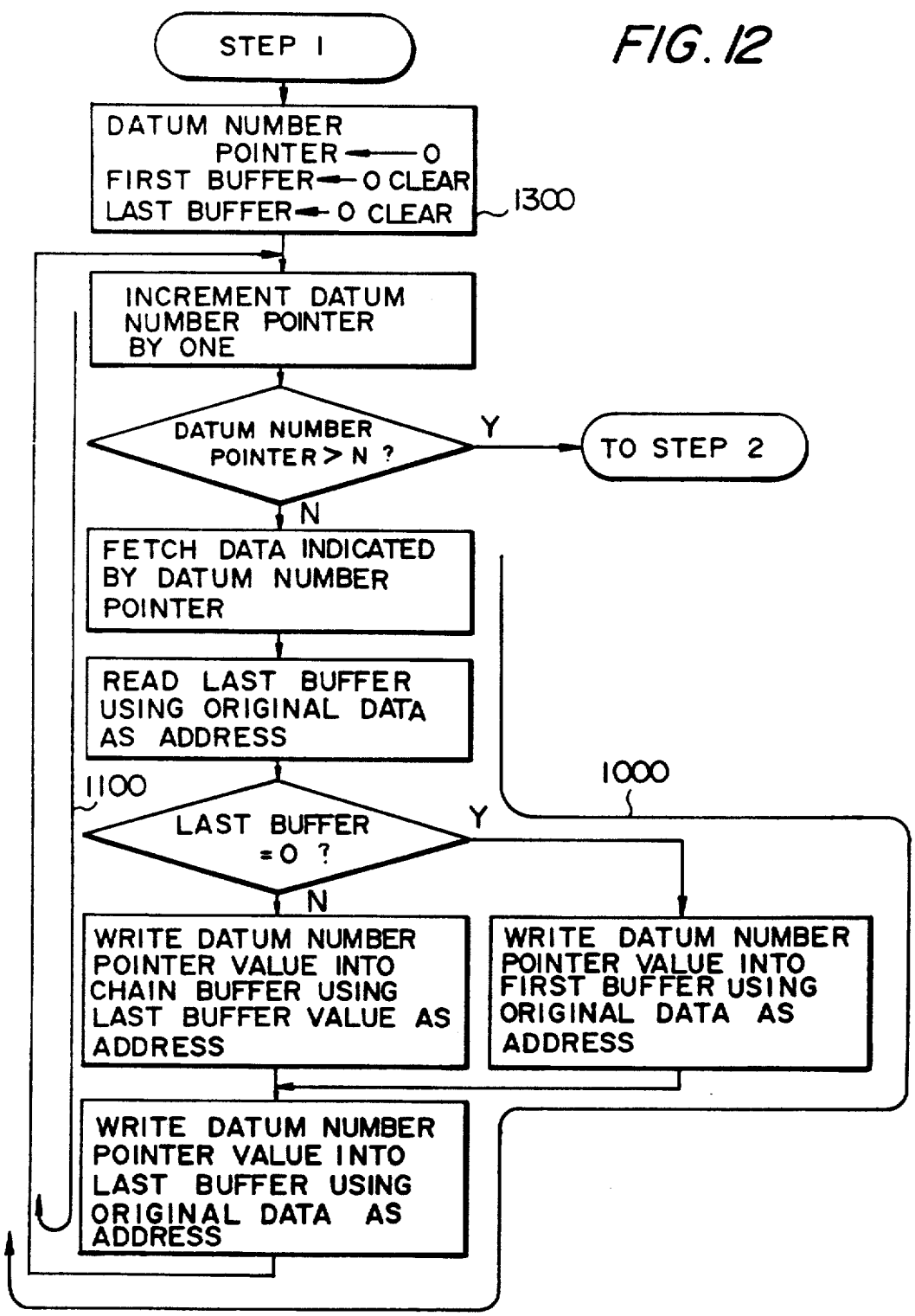
FIG. 12 is a flowchart illustrating the operation of the circuit shown in FIG. 11.

FIG. 11 shows the concrete arrangement of the first control 80a shown in FIG. 19 while FIG. 12 is a flowchart illustrating its operation.

The first control 80a reads out Z-axis data from the reference-axis data memory 10 in the order following their datum numbers. By using the read Z-axis data as addresses, the corresponding datum numbers are written into the first and last buffer memory 20 and 30. At the same time, the datum numbers are updated and stored in the last buffer memory 30. The after-updated datum numbers are then written into the chain buffer memory 40 by using the before-updated datum numbers as addresses.

In the illustrated arrangement, the first control 80a comprises a datum number pointer 12, a data register 54, a comparing and deciding circuit 110 and a step-1 control circuit 112.

As mentioned previously, the datum number pointer 12 is adapted to output datum numbers 1 through N used as write/read addresses for the reference-axis data memory 10.

When Z-axis data are outputted from the reference-axis data memory 10 toward each of the buffer memories 20, 30 and 40, the datum number pointer 12 increments and outputs these datum numbers in the order starting from one and terminating at N, as shown in FIG. 3.

The Z-axis data are thus supplied from the reference-axis data memory 10 to the address input terminal of each buffer memory 20 or 30 in the order following the datum numbers and at the same time to the step-1 control circuit 112.

At this time, the datum numbers outputted from the datum number pointer 12 are applied to the data input terminals I of the first buffer memory 20, last buffer memory 30 and chain buffer memory 40 and at the same time to the comparing and deciding circuit 110.

As shown by a flow 1000 in FIG. 12, for example, the datum numbers inputted into the data input terminals I are respectively written and stored in the corresponding datum number storage areas 24 and 34 of the first and last buffer memories 20 and 30 by using the reference-axis data inputted into the address input terminals A as write addresses.

At this time, if the datum numbers within the last datum number storage areas 34 are updated and stored therein, the before-updated datum numbers are outputted from the output terminal O of the last buffer memory 30 toward the address input terminal A of the chain buffer memory 40.

As shown by a flow 1100 in FIG. 12, therefore, new datum numbers outputted from the datum number pointer 12 will be written and stored in the chain datum number storage areas 44 of the chain buffer memory 40 by using the before-updated datum numbers outputted from the last buffer memory 30 as addresses.

Such a data transfer and write operation is repeated at each time when new datum numbers from the datum number pointer 12 are incremented.

When the datum numbers incremented in and outputted from the datum number pointer 12 match the polygon information outputted from the data register 54 and corresponding to one scene on the CRT, the comparing and deciding circuit 110 outputs a transfer control terminating signal to the step-1 control circuit 112. The step-1 control circuit 112 in turn terminates a series of data writing operations for the buffer memories 20, 30 and 40.

Next, the sorting circuit is changed to step 2. There is initiated a series of operations through which the datum numbers in the datum number storage areas 24 of the first buffer memory 20 are written into the corresponding datum number storage areas 44 of the chain buffer memory 40 by using the datum numbers stored in the last buffer memory 30 at the respective datum number storage areas 34 as addresses.

(b) Second Control 80b

Figure 13:
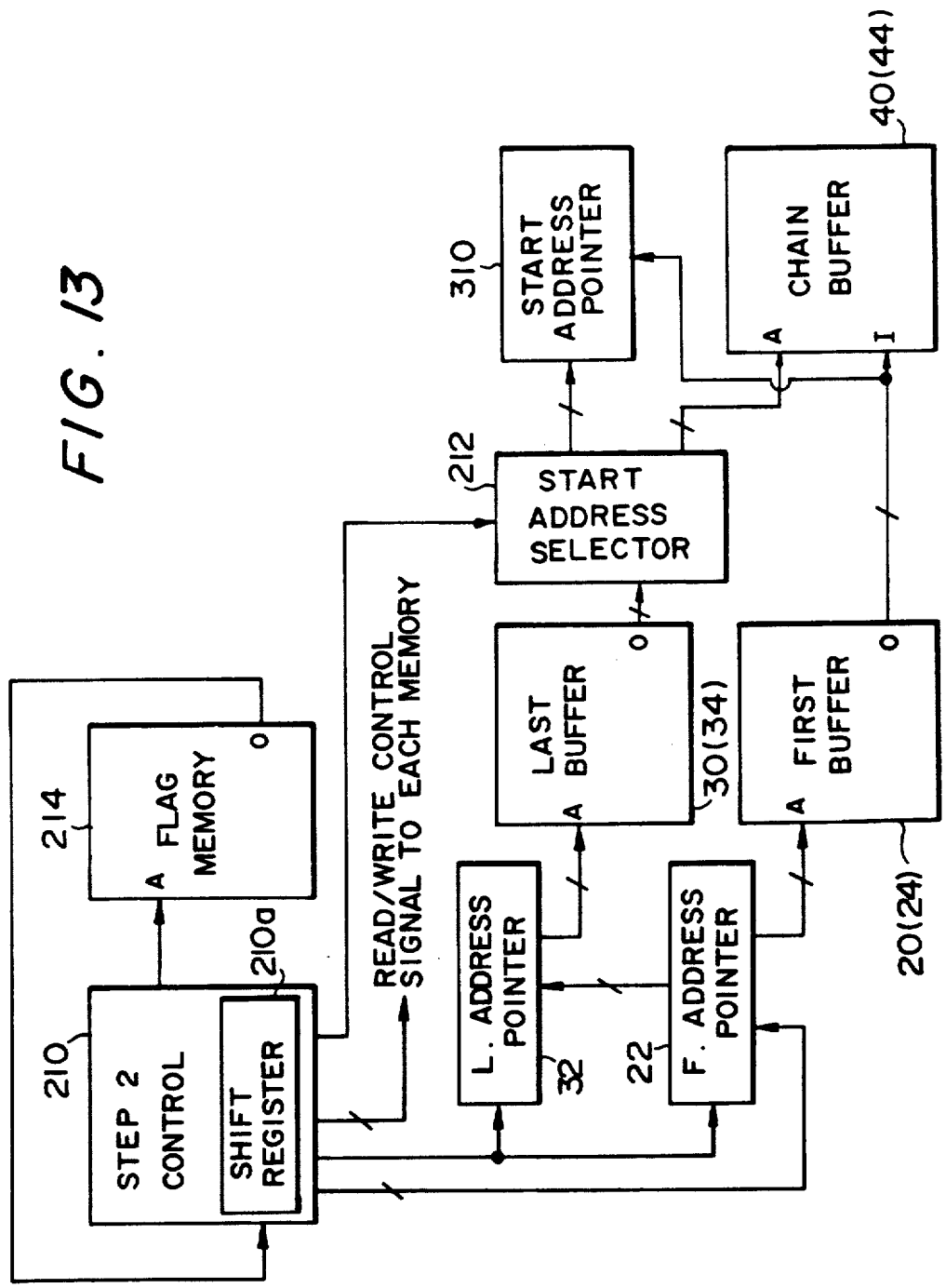
FIG. 13 is a block diagram of the concrete arrangement of another sorting circuit according to the present invention.
Figure 14:
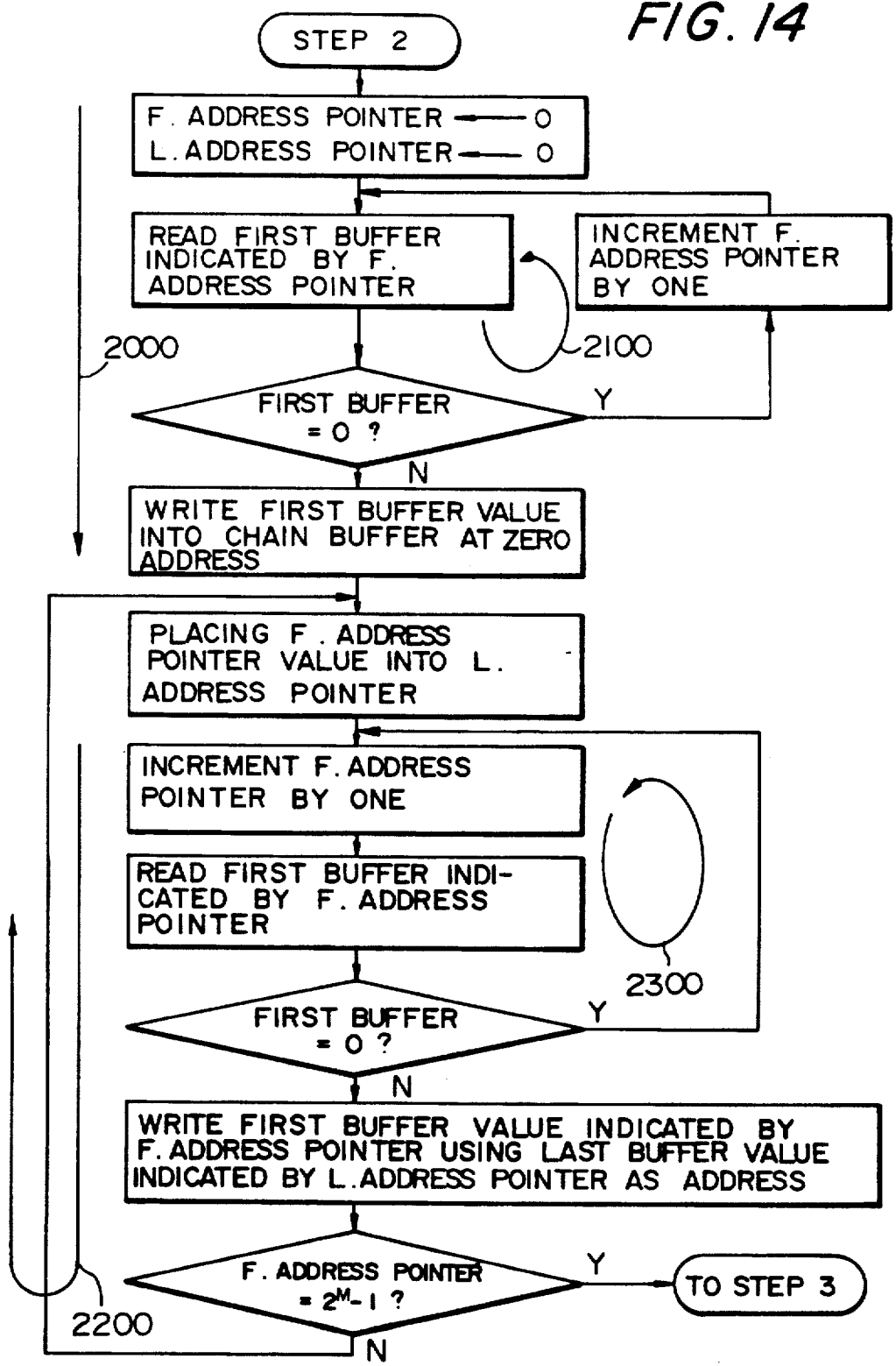
FIG. 14 is a flowchart illustrating the operation of the circuit shown in FIG. 13.

FIG. 13 shows the concrete circuit arrangement of the second control 80b for performing the transfer control at the step 2 while FIG. 14 is a flowchart illustrating its operation.

The second control 80b comprises a step-2 control circuit 210, a start address selector 212, a start address pointer 214 and address pointers 22 and 32.

As the step 2 is initiated, the step-2 control circuit 210 resets each of the address pointers 22 and 32 to "0" in accordance with a flow 2000 shown in FIG. 14. It is then judged whether or not a datum number has been written into a first datum number storage area 24 addressed by the address "0" from the address pointer 22. If no datum number is stored in this address "0", the address pointer 22 is incremented. It is further judged whether or not a datum number has been stored in a first datum number storage area 24 specified by a newly incremented address. Such a decision is repeated in accordance with a flow 2100 shown in FIG. 14 until a first datum number storage area 24 storing a datum number is detected.

If the first datum number storage area 24 storing the datum number is detected, this datum number is then set in the start address pointer 310 as a start address. As shown in FIG. 3, for example, a datum number "5" corresponding to the smallest reference-axis datum will be read from a first datum number storage area 24 in which the smallest reference-axis datum has been stored, that is, a first datum number storage area 24 specified by the address "0". The datum number "5" may be then set in the start address pointer 310 as a start address.

If the start address has been set in such a manner, a series of operations are repeated in which by using a datum number stored in each of the last datum number storage areas 34 as address, a datum number stored in one of the first datum number storage areas 24 placed in a predetermined relationship relative to the aforementioned last datum number storage area 34 is written into the corresponding one of the chain datum number storage areas 44 in accordance with a flow 2200 shown in FIG. 14. As shown in FIG. 3, for example, datum numbers will be thus written into the respective chain datum number storage areas 44 to chain the reference-axis data (in this case, Z-axis data) with each other in the ascending order.

As shown in FIG. 14, for example, if there is any storage area having no datum number among the datum number storage areas 24 and 34, the address pointer 24 may be incremented until any first datum number storage area 24 having a datum number is detected, while judging whether or not any datum number has be written in any first datum number storage area, in accordance with a flow 2300 shown in FIG. 14.

If there is detected a first datum number storage area 24 having a datum number stored therein, this datum number is immediately written into the corresponding chain datum number storage area 44 similarly in accordance with the flow 2200.

(c) Flag Memory 214

When hundreds or thousands of reference-axis data are to be sorted, some large time periods is required to detect first datum number storage areas 24 having reference-axis data written therein. Considering the fact that the three-dimensional image synthesizer is required to terminate a series of sorting operations within one field time (1/60 seconds), the aforementioned detection time cannot be ignored.

The sorting circuit may include a flag memory 214 for greatly reducing such a detection time and for performing the sorting operations at high speed.

Figure 16:
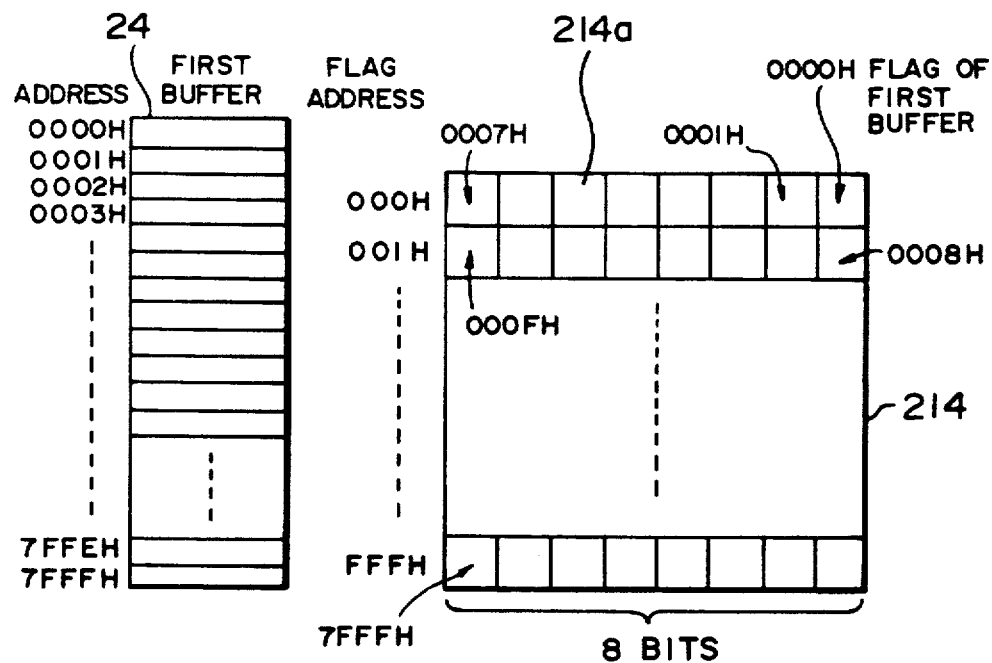
FIG. 16 illustrates the construction of the flag memory used in the circuit of FIG. 13 together with the first datum number storage areas.

FIG. 16 shows such a flag memory 214 in relationship with the first datum number storage areas 24.

The flag memory 214 has a plurality of one-bit flag storage areas 214a each of which is operatively associated with one of the first datum number storage areas 24. If a datum is stored in a first datum number storage area 24, a flag will be set at the corresponding one-bit flag storage area 214a.

The flag memory 214 is formed such that eight one-bit flag areas are specified as a group by flag addresses and that flag information sections in the form of a group (eight-bit data) is outputted from a group of addressed flag areas.

For example, if a flag address 000H is specified, it can be judged at once whether or not any storage area having a datum number written therein exists among the first datum number storage areas 24 addressed by addresses 0000H–0007H and corresponding to eight bits, from eight-bit flag information sections outputted from the flag memory 214.

Figure 15:
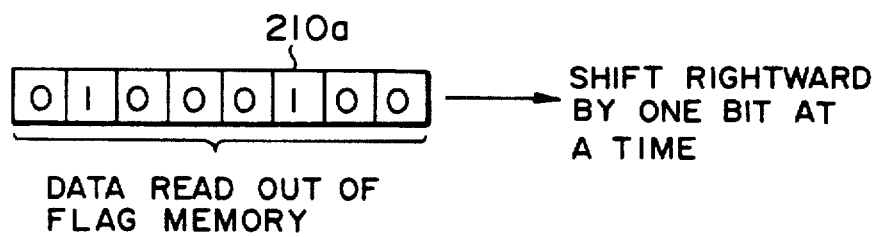
FIG. 15 illustrates a flag registered within a shift register in the circuit of FIG. 13.

If a flag indicative of the writing of datum number is detected as a datum number storage areas 24 having a datum number written therein is being searched by the flag memory 214, eight-bit flag information specified by a flag address is written into a shift register 210a, as shown in FIG. 15.

The step-2 control circuit 210 shifts the contents of the shift register 210a rightward one bit at a time such that any first datum number storage area 24 having a datum number written therein can be detected.

In such a manner, the step-2 control circuit 210 may read out the contents of the flag memory 214 eight bits at a time while incrementing the flag addresses of the flag memory 214 in the order starting from 000H, so that a first datum number storage area 24 having a datum number written therein can be detected at high speed.

The writing of flag into the flag memory 214 may be accomplished by the step-1 control circuit 112 shown in FIG. 11. more particularly, the step-1 control circuit 112 is adapted to write datum numbers into the first datum number storage areas of the first buffer memory 20 and at the same time to set the corresponding flags of the flag memory 214 sequentially.

Thus, the operation of the step 2 shown in FIG. 14, that is, the writing of data from the buffer memories 20 and 30 to the chain buffer memory 40 can be performed at high speed.

By the use of such a flag memory 214, it will not be required to clear the buffrer memories 20 and 30 since the purpose can be sufficiently attained by clearing the flag memory 214.

The provision of a group of eight-bit flag memory 214 specified by flag addresses is taken by the fact that it is considered that such a provision is optimum for the physical memory size and for the probability.

For example, it is considered herein that the read-out time can be minimized by what bit unit if data equal in number to $2^{11}$ are written in random at addresses equal in number to $2^{15}$. When the calculation is made with respect to the bit unit addressed by each of the flag addresses based on 16-bit, 8-bit, 4-bit and 2-bit, it is understood that 4-bit is minimum. Since data may be overlapped at the same address, however, it may be expected that the minimum value can be obtained by selecting 4-bit and 8-bit units specified by the flag addresses. Notwithstanding, we selected 8-bit unit in viewpoint of the physical memory arrangement.

(d) Third Control 80c

After the datum numbers of the reference-axis data have been written into the datum number storage area 44 of the chain buffer memory 40 to chain the reference-axis data with each other in the ascending order, a step 3 is initiated such that the dataum numbers are again read out therefrom in accordance with a predetermined read-out rule. The polygon information sections are then sorted in and outputted from the XYRAM 58 in the order following the datum numbers thus read out.

Figure 17:
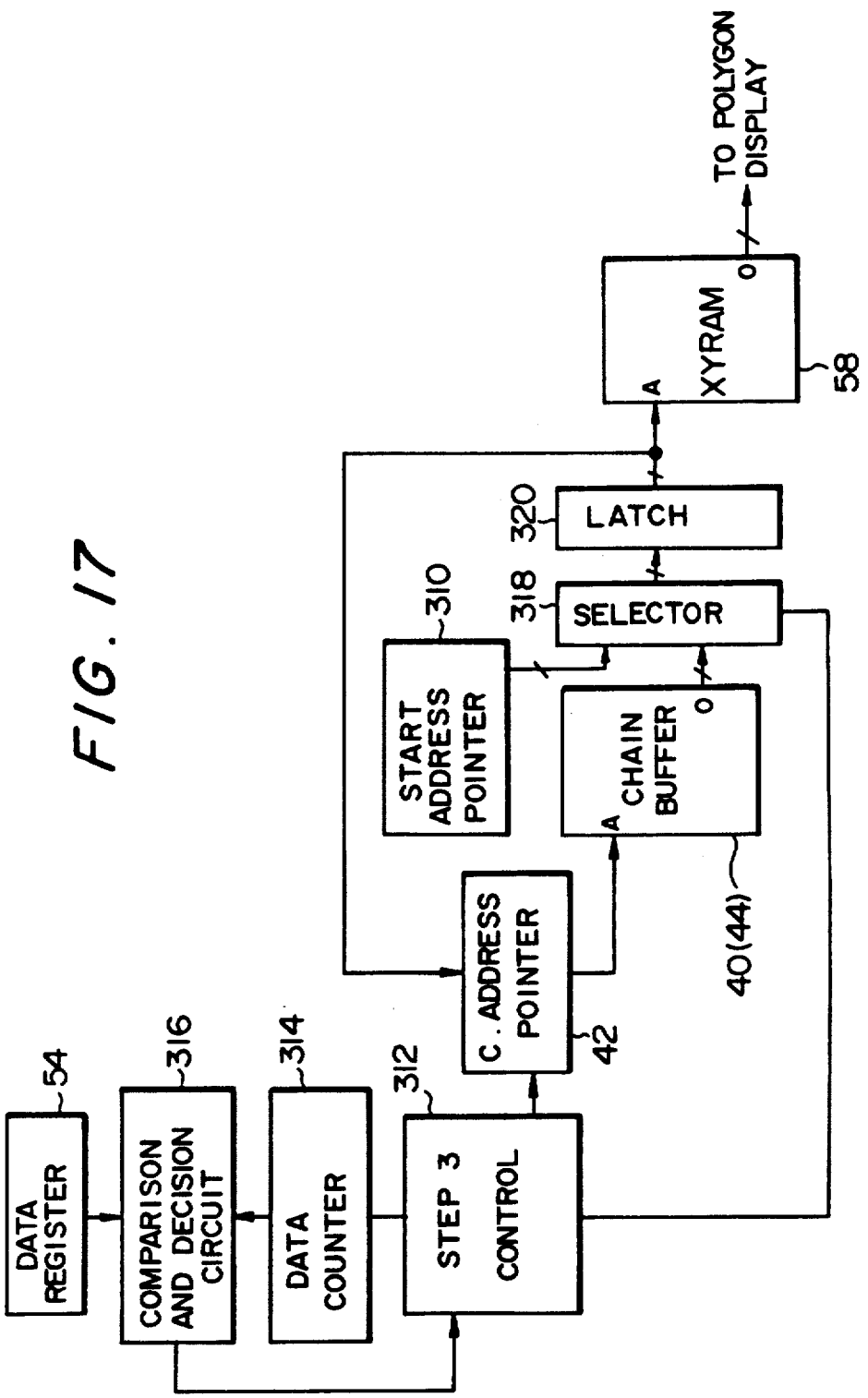
FIG. 17 is a block diagram of the concrete arrangement of still another sorting circuit constructed in accordance with the present invention.
Figure 18:
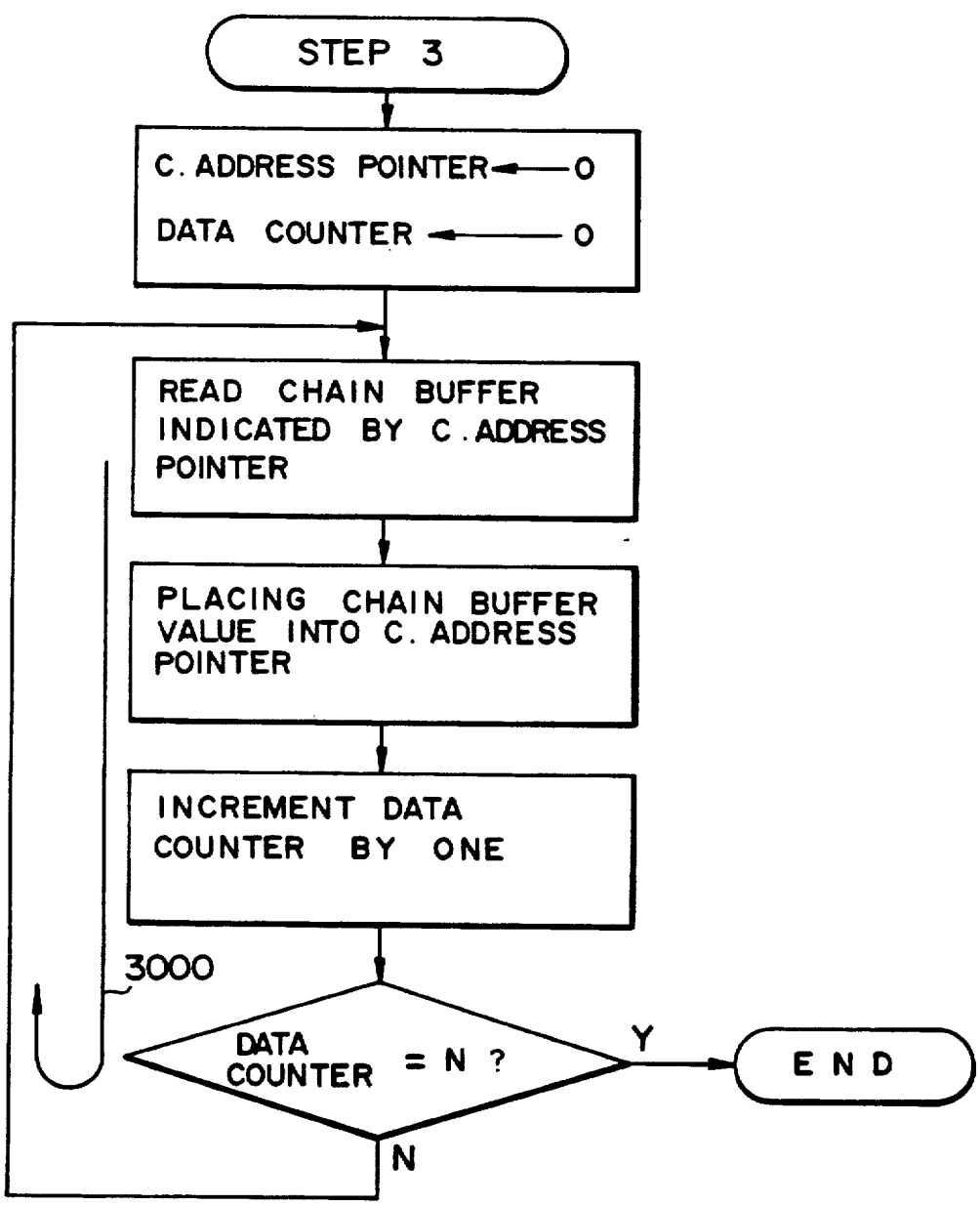
FIG. 18 is a flowchart illustrating the operation of the circuit shown in FIG. 17.

FIG. 17 illustrates the concrete arrangement of the third control 80c which is operative to perform the step 3 and FIG. 18 shows a flowchart illustrating the operation at the step 3.

The third control 80c comprises a step-3 control circuit 312, a data counter 314, a comparing and deciding circuit 316, an address pointer 42, a start address pointer 310, a selector 318 and a latch 320.

As the step 3 is started, the step-3 control circuit 312 first resets the address pointer 42 and the data counter 314. Next, the selector 318 is shifted to the side of the start address pointer 310. Datum numbers pre-set in the start address pointer 310 are outputted to the XYRAM 58 through the selector 318 and latch 320 as start addresses.

As shown in FIG. 3, for example, if a datum number "5" is set as a start address, a polygon information section specified by this datum number "5" will be outputted from the XYRAM 58.

In synchronism with such a reading-out operation, the value of the data counter 314 is incremented by one and at the same time the datum number from the latch 320 is set at the address pointer 42 as the next read-out address.

If the first polygon information section is read out in such a manner, the step-3 control circuit 312 is then shifted from the side of the start address pointer 310 to the side of the chain buffer memory 40. The step-3 control circuit 312 then sorts and outputs the polygon information sections from the XYRAM 58 based on Z-axis data in accordance with a flow 3000 shown in FIG. 18.

More particularly, if a datum number is outputted from the address pointer 42 as a read-out address, the corresponding datum number is read out from a chain datum number storage area 44 specified by this read-out address through the selector and latch 318 and 320. A polygon information section is outputted from the XYRAM 58 using the read datum number as read-out address and at the same time said datum number is set at the address pointer 42 as a newly read address.

The sorting circuit will repeat such a read-out operation of polygon information sections.

At this time, the data counter 314 counts the number of accesses to the XYRAM 58, that is, the number of polygon information sections sorted in and outputted from the XYRAM 58. The resulting counts are supplied to the comparing and deciding circuit 316.

If the counts from the data counter 314 match the number of the polygon information sections pre-set by the data register 54, the comparing and deciding circuit 316 outputs a termination signal to the step-3 control circuit 312.

Thus, the sorting circuit terminates a series of sorting operations.

It is of course that the present invention is not limited to the aforementioned embodiments and that many modifications and changes thereof may be made within the concept of the present invention.

As will be apparent from the foregoing, the present invention provides a sorting circuit which can sort and output a great number of reference-axis data in a simple and high-speed manner.

Particularly, the present invention can sort the reference-axis data at high speed even though the number of the reference-axis data is substantially larger relative to the number of bits in each of the reference-axis data. This means that the sorting circuit is very effective to sort a great number of data.

Even if the reference-axis data are combined with various information sections to increase the amount of data to be processed, the present invention can be broadly used over various types of applications since the increased amount of data can be sorted at high speed based on the reference-axis data.

What is claimed is:

1. A circuit for sorting a plurality of inputted reference-axis data, comprising:
   means for generating a datum number corresponding to each of the inputted reference-axis data;
   a first buffer memory having first datum number storage areas which are addressed by said reference-axis data, each of the first datum number storage areas being adapted to store a datum number generated by said datum number generating means when a reference-axis datum corresponding to each of the first datum number storage areas is first inputted into said first buffer memory;

a last buffer memory having last datum number storage areas which are addressed by said reference-axis data, each of the last datum number storage areas being adapted to update and store a datum number generated by said datum number generating means at each time when a reference-axis datum corresponding to each of said last datum number storage areas is inputted into said last buffer memory;

a chain buffer memory having chain datum number storage areas each of which is addressed by the corresponding datum number;

a first control means for writing a new updated datum number into a chain datum number storage area addressed by a before-updated datum number in said last buffer memory at each time when the before-updated datum number is updated;

a second control means for writing a datum number stored in each one of said first datum storage areas and corresponding in a predetermined relation to said datum number of said last datum number storage area into said chain datum number storage area, said chain datum number storage area addressed by said datum number stored in said last datum number storage area after the writing of the numbers of said data into said first and last buffer memories has been completed, thereby causing the reference-axis data to chain in said chain datum number storage areas in ascending or descending order; and a third control means for reading the datum numbers out of said chain datum number storage areas in accordance with a predetermined read-out rule and then sorting and outputting the inputted reference-axis data in the sequence of the read-out datum numbers.

2. A sorting circuit as defined in claim 1, further comprising a reference-axis data memory for storing reference-axis data inputted thereinto with their datum numbers and wherein said datum number generating means comprises a datum number pointer for outputting the datum numbers toward said reference-axis data memory as read-out addresses and for reading out each of the reference-axis data from said reference-axis data memory in the order following the datum number, said first buffer memory being adapted to store a datum number outputted from said address pointer when the corresponding reference-axis datum from said reference-axis data memory is first inputted into each of the storage areas, said last buffer memory being adapted to update the datum number stored in each of the storage areas into the datum number outputted from said address pointer at each time when the corresponding reference-axis datum is read out from said reference-axis data memory, and said third control means being adapted to read out datum numbers stored at the chain datum number storage areas in accordance with a predetermined read-out rule and to sort and output the reference-axis data from said reference-axis data memory in the order following the datum numbers thus read out.

3. A sorting circuit as defined in claim 1, further comprising a reference-axis data memory for storing reference-axis data inputted thereinto with their datum numbers and wherein said datum number generating means comprises a counter for outputting a datum number to each of said buffer memories at each time when the corresponding reference-axis datum is inputted into said datum number generating means, said first buffer memory being adapted to store a datum number from said counter at a storage area when this storage area is first addressed by a reference-axis datum inputted thereinto, said last buffer memory being adapted to update a datum number written in each of the storage areas into a datum number outputted from said counter at each time when said storage area is addressed by a reference-axis datum inputted thereinto, and said third control means being adapted to read out datum numbers written at the chain datum number storage areas in accordance with a predetermined read-out rule and to sort and output the reference-axis data from said reference-axis data memory in the order following their datum numbers thus read out.

4. A sorting circuit for sorting a plurality of inputted data based on given reference-axis data, comprising:

an information memory for storing the necessary portion of each of said plurality of inputted data with its datum number and sorting means for receiving the reference-axis data in each of said data, said sorting means comprising means for generating a datum number corresponding to each of the inputted reference-axis data;

a first buffer memory having first datum number storage areas which are addressed by said reference-axis data, each of the first datum number storage areas being adapted to store a datum number generated by said datum number generating means when a reference-axis datum corresponding to each of the first datum number storage areas is first inputted into said first buffer memory;

a last buffer memory having last datum number storage areas which are addressed by said reference-axis data, each of the last datum number storage areas being adapted to update and store a datum number generated by said datum number generating means at each time when a reference-axis datum corresponding to each of said last datum number storage areas is inputted into said last buffer memory;

a chain buffer memory having chain datum number storage areas each of which is addressed by the corresponding datum number;

a first control means for writing a new updated datum number into a chain datum number storage area addressed by a before-updated datum number in said last buffer memory at each time when the before-updated datum number is updated;

a second control means for writing a datum number stored in each one of said first datum number storage areas and corresponding in a predetermined relation to said datum number of said last datum number storage area into said chain datum number storage area, said chain datum number storage area addressed by said datum number stored in said last datum number storage area after the writing of the datum numbers into said first and last buffer memories has been completed, thereby causing the reference-axis data to chain in said chain datum number storage areas in ascending order; and a third control means for reading the datum numbers out of said chain datum number storage areas in accordance with a predetermined read-out rule and reading the data from said information memory in the order following the datum numbers thus read out.

5. A sorting circuit as defined in claim 1 wherein said second control means comprises a flag memory having a plurality of one-bit flag areas each corresponding to one of said first datum number storage areas, said flag memory adapted to set a flag at one of said flag areas when a datum number is stored in the corresponding first datum number storage area, each of said flag areas assigned by a given group of flag addresses, whereby a flag information section can be read out as a group unit from each of said groups of flag areas addressed by each of the addresses so as to judge whether or not any datum number has been written into each of the datum number storage areas, without reading any datum number out of each of said datum number storage areas.

6. A sorting circuit as defined in claim 1, further comprising a first buffer address pointer for addressing said first datum number storage areas and a last buffer address pointer for addressing said last datum number storage areas and wherein said first control means is adapted to judge whether or not a reference-axis datum initially appears when the datum number corresponding to said reference-axis datum is inputted into said first control means from said datum number generating means, to set a reference-axis datum at each of said first and last buffer address pointers to write the corresponding datum number into said first and last buffer memories when it is judged that said reference-axis datum initially appears, and to set a reference-axis datum at said last buffer address pointer to update only the corresponding datum number for said last buffer memory when it is judged that said reference-axis datum has already appeared.

7. A sorting circuit as defined in claim 6, further comprising a chain buffer address pointer for addressing the chain datum number storage areas and wherein said first control means is operative such that when the contents of the last datum number storage areas of said last buffer memory are updated and stored, a before-updated datum number is set at said chain buffer address pointer and a new after-updated datum number is written into the corresponding datum number storage area of the chain buffer memory specified by this address.

8. A sorting circuit as defined in claim 7 wherein said second control means is adapted to perform a series of data writing operations through which a datum number stored in each of the last datum number storage areas of said last buffer memory is set at said chain buffer address pointer, the datum number of a first datum number storage area placed in a predetermined relationship with an address being written into a chain datum number storage area addressed by said chain buffer address pointer using said address, whereby the datum numbers of the reference-axis data can be written into the chain datum number storage areas to chain said reference-axis data with each other in the ascending or descending order.

9. A sorting circuit as defined in claim 8 wherein said second control means is adapted to search the first datum number storage areas in which data have been stored in the order starting from the smallest value of the reference-axis data and to write the datum numbers of the reference-axis data into the chain datum number storage areas to chain said reference-axis data with each other in the ascending order by using a datum number stored in each of the storage areas as a start address which is used to initiate the writing of data into the chain datum number storage areas.

10. A sorting circuit as defined in claim 8 wherein said second control means is adapted to search the first datum number storage areas in which data have been stored in the order starting from the largest value of the reference-axis data and to write the datum numbers of the reference-axis data into the chain datum number storage areas to chain said reference-axis data with each other in the descending order by using a datum number stored in each of the storage areas as a start address which is used to initiate the writing of data into the chain datum number storage areas.

11. A sorting circuit as defined in claim 4, further comprising a reference-axis data memory for storing reference-axis data inputted thereinto with their datum numbers and wherein said datum number generating means comprises a datum number pointer for outputting the datum numbers toward said reference-axis data memory as read-out addresses and for reading out each of the reference-axis data from said reference-axis data memory in the order following the datum number, said first buffer memory being adapted to store a datum number outputted from said address pointer when the corresponding reference-axis datum from said reference-axis data memory is first inputted into each of the storage areas, said last buffer memory being adapted to update the datum number stored in each of the storage areas into the datum number outputted from said address pointer at each time when the corresponding reference-axis datum is read out from said reference-axis data memory, and said third control means being adapted to read out datum numbers stored at the chain datum number storage areas in accordance with a predetermined read-out rule and to sort and output the reference-axis data from said reference-axis data memory in the order following the datum numbers thus read out.

12. A sorting circuit as defined in claim 4 wherein said datum number generating means comprises a counter for outputting a datum number to each of said buffer memories at each time when the corresponding reference-axis datum is inputted into said datum number generating means, said first buffer memory being adapted to store a datum number from said counter at a storage area when this storage area is first addressed by a reference-axis datum inputted thereinto, said last buffer memory being adapted to update a datum number written in each of the storage areas into a datum number outputted from said counter at each time when said storage area is addressed by a reference-axis datum inputted thereinto, and said third control means being adapted to read out datum numbers written at the chain datum number storage areas in accordance with a predetermined read-out rule and to sort and output the reference-axis data from said reference-axis data memory in the order following their datum numbers thus read out.

13. A sorting circuit as defined in claim 4, further comprising a first buffer address pointer for addressing said first datum number storage areas and a last buffer address pointer for addressing said last datum number storage areas and wherein said first control means is adapted to judge whether or not a reference-axis datum initially appears when the datum number corresponding to said reference-axis datum is inputted into said first control means from said datum number generating means, to set a reference-axis datum at each of said first and last buffer address pointers to write the corresponding datum number into said first and last buffer memories when it is judged that said reference-axis datum initially appears, and to set a reference-axis datum at said last buffer address pointer to update only the corresponding datum number for said last buffer memory when it is judged that said reference-axis datum has already appeared.

14. A sorting circuit as defined in claim 13, further comprising a chain buffer address pointer for addressing the chain datum number storage areas and wherein said first control means is operative such that when the contents of the last datum number storage areas of said last buffer memory are updated and stored, a before-updated datum number is set at said chain buffer address pointer and a new after-updated datum number is written into the corresponding datum number storage area of the chain buffer memory specified by this address.

15. A sorting circuit as defined in claim 14 wherein said second control means is adapted to perform a series of data writing operations through which a datum number stored in each of the last datum number storage areas of said last buffer memory is set at said chain buffer address pointer, the datum number of a first datum number storage area placed in a predetermined relationship with an address being written into a chain datum number storage area addressed by said chain buffer address pointer using said address, whereby the datum numbers of the reference-axis data can be written into the chain datum number storage areas to chain said reference-axis data with each other in the ascending or descending order.

16. A sorting circuit as defined in claim 15 wherein said second control means is adapted to search the first datum number storage areas in which data have been stored in the order starting from the smallest value of the reference-axis data and to write the datum numbers of the reference-axis data into the chain datum number storage areas to chain said reference-axis data with each other in the ascending order by using a datum number stored in each of the storage areas as a start address which is used to initiate the writing of data into the chain datum number storage areas.

17. A sorting circuit as defined in claim 15 wherein said second control means is adapted to search the first datum number storage areas in which data have been stored in the order starting from the largest value of the reference-axis data and to write the datum numbers of the reference-axis data into the chain datum number storage areas to chain said reference-axis data with each other in the descending order by using a datum number stored in each of the storage areas as a start address which is used to initiate the writing of data into the chain datum number storage areas.

18. A sorting circuit as defined in claim 4 wherein said information memory stores at least two-dimensional information sections (X, Y) among a plurality of three-dimensional information sections (X, Y, Z) in the order following their datum numbers and wherein said sorting means is adapted to receive Z-axis data included in said three-dimensional information sections as reference-axis data, whereby the three-dimensional information sections contained in said information memory can be sorted and outputted based said Z-axis data in the ascending or descending order.

19. A sorting circuit as defined in claim 4 wherein said second control means comprises a flag memory having a plurality of one-bit flat areas each corresponding to one of said first datum number storage areas, said flag memory adapted to set a flag at one of said flag areas when a datum number is stored in the corresponding first datum number storage area, each of said flag areas assigned by a given group of flag addresses, whereby a flag information section can be read out as a group unit from each of said groups of flag areas addressed by each of the addresses so as to judge whether or not any datum number has been written into each of the datum number storage areas, without reading any datum number out of each of said datum number storage areas.

20. A sorting circuit for sorting a plurality of reference-axis data, each consisting of a plurality of digits in accordance with a datum number given to each of said reference-axis data, said sorting circuit comprising:
a reference-axis data memory for storing said reference-axis data with their datum numbers;
a datum number pointer for outputting a datum number to said reference-axis data memory as a read-out address and to read the lowest searched digit of each of said reference-axis data from said reference-axis memory in the order following the datum numbers;
a first buffer memory including first datum number storage areas each of which can be addressed based on one of the reference-axis data having a given searched digit and outputted from said reference-axis data memory and for storing a datum number from said address pointer when the corresponding reference-axis datum is initially inputted from said reference-axis data memory into one of said first datum number storage areas;
a last buffer memory including last datum number storage areas each of which can be addressed based on one of the reference-axis data having a given searched digit and outputted from said reference-axis data memory, said last buffer memory being adapted to update a datum number stored in one of the last datum number storage areas into a datum number from said address pointer at each time when the corresponding reference-axis datum is read out from said reference-axis data memory at its storage area;
a chain buffer memory including chain datum number storage areas which can be addressed by the datum numbers;
a first control means for writing a newly updated datum number into a chain datum number storage area addressed by a before-updated datum number at each time when the datum number of said last buffer memory is updated;
a second control means, which is operative after the writing of data into said first and last buffer memories has terminated, for writing a datum number stored in each one of said first datum number storage areas and placed in a predetermined relationship with said datum number of said last datum number storage area into said chain datum number storage area, said datum number storage area addressed by the datum number stored in the last datum number storage area, whereby the datum numbers of the reference-axis data can be written into the chain datum number storage areas to chain said reference-axis data with each other in the ascending or descending order;
a fourth control means for setting the next higher searched digit of a reference-axis datum and for reading the datum numbers from said chain datum number storage areas in accordance with a predetermined read-out rule, said fourth control means being adapted to perform the sorting operation of each of the searched digits such that the set searched digits of said reference-axis data are outputted from said reference-axis data memory to each of said first and second buffer memories in the order following their datum numbers, said sorting operation being repeated while shifting the searched digits by one digit in the order starting from the lowest digit of the reference-axis data and terminating at the highest digit thereof; and a third control means operative such that after the highest searched digit has been sorted, the datum numbers written in said chain datum number storage areas being read out therefrom in a predetermined read-out rule, whereby said reference-axis data can be sorted and outputted from said reference-axis data memory in the order following their datum numbers.

21. A circuit for sorting a plurality of inputted data based on given reference-axis data, said circuit comprising:

an information memory for storing the necessary part of each of said data with its datum number and sorting means for receiving reference-axis data included in each of said data, said sorting means comprising a reference-axis data memory for storing said reference-axis data with their datum numbers;

a datum number pointer for outputting a datum number toward said reference-axis data memory as a read-out address and for reading the lowest searched digits of said reference-axis data from said reference-axis data memory in the order following their datum numbers;

a first buffer memory including first datum number storage areas each of which can be addressed based on one of the reference-axis data having a given searched digit and outputted from said reference-axis data memory and for storing a datum number from said address pointer when the corresponding reference-axis datum is initially inputted from said reference-axis data memory into one of said first datum number storage areas;

a last buffer memory including last datum number storage areas each of which can be addressed based on one of the reference-axis data having a given searched digit and outputted from said reference-axis data memory, said last buffer memory being adapted to update a datum number stored in one of the last datum number storage areas into a datum number from said address pointer at each time when the corresponding reference-axis datum is read out from said reference-axis data memory at its storage area;

a chain buffer memory including chain datum number storage areas which can be addressed by the datum numbers;

a first control means for writing a newly updated datum number into a chain number storage area addressed by a before-updated datum number at each time when the datum number of said last buffer memory is updated;

a second control means, which is operative after the writing of data into said first and last buffer memories has terminated, for writing a datum number stored in each one of said first datum number storage areas and placed in a predetermined relationship with said last datum number storage area into said chain datum number storage area, said chain datum number addressed by the datum number stored in the last datum number storage area, whereby the datum numbers of the reference-axis data can be written into the chain datum number storage areas to chain said reference-axis data with each other in the ascending or descending order;

a fourth control means for setting the next higher searched digit of a reference-axis datum and for reading the datum numbers from said chain datum number storage areas in accordance with a predetermined read-out rule, said fourth control means being adapted to perform the sorting operation of each of the searched digits such that the set searched digits of said reference-axis data are outputted from said reference-axis data memory to each of said first and second buffer memories in the order following their datum numbers, said sorting operation being repeated while shifting the searched digits by one digit in the order starting from the lowest digit of the reference-axis data and terminating at the highest digit thereof; and a third control means operative such that after the highest searched digit has been sorted, the datum numbers written in said chain datum number storage areas being read out therefrom in a predetermined read-out rule, whereby said reference-axis data can be sorted and outputted from said reference-axis data memory in the order following their datum numbers.

* * * * *

UNITED STATES PATENT AND TRADEMARK OFFICE
CERTIFICATE OF CORRECTION

PATENT NO. : 5,179,717
DATED : January 12, 1993
INVENTOR(S) : Seiichi Sato et al It is certified that error appears in the above-identified patent and that said Letters Patent is hereby corrected as shown below:

On the cover page, at [73] Assignee:, change "Manco, Ltd.,"

to --Namco, Ltd.,--.

Signed and Sealed this

Twenty-fifth Day of January, 1994

Attest:

BRUCE LEHMAN

*Attesting Officer*     *Commissioner of Patents and Trademarks*